United States Patent
Takeda et al.

(10) Patent No.: US 6,840,683 B2
(45) Date of Patent: Jan. 11, 2005

(54) EMBEDDED LIGHT TRANSFER MEDIUM WITH A PROTECTION TUBE AND AN ELASTIC COVERING

(75) Inventors: Nobuo Takeda, Saitama (JP); Hiroaki Tsutsui, Kakamigahara (JP); Akio Kawamata, Kakamigahara (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/413,400

(22) Filed: Apr. 15, 2003

(65) Prior Publication Data

US 2004/0005120 A1 Jan. 8, 2004

(30) Foreign Application Priority Data

Apr. 18, 2002 (JP) .................................... 2002-116728

(51) Int. Cl.[7] ................................................ G02B 6/38
(52) U.S. Cl. ............................ 385/60; 385/70; 385/55
(58) Field of Search ............................ 385/60, 55, 70, 385/71, 75, 76, 77

(56) References Cited

U.S. PATENT DOCUMENTS

| | | | |
|---|---|---|---|
| 4,818,061 A | * | 4/1989 | Iwano et al. .................. 385/72 |
| 5,299,273 A | | 3/1994 | Evans |
| 5,452,390 A | | 9/1995 | Bechtel et al. |
| 5,568,582 A | | 10/1996 | Rajic et al. |
| 5,751,874 A | * | 5/1998 | Chudoba et al. ............... 385/72 |
| 6,035,084 A | | 3/2000 | Haake et al. |
| 6,547,448 B2 | * | 4/2003 | Johnson et al. ................ 385/70 |
| 6,582,135 B2 | * | 6/2003 | Brun et al. .................... 385/78 |
| 6,625,376 B2 | * | 9/2003 | Werkheiser et al. ......... 385/139 |

FOREIGN PATENT DOCUMENTS

| | | |
|---|---|---|
| EP | 1 193 516 A2 | 4/2002 |
| EP | 1 258 760 A2 | 11/2002 |
| JP | 63104005 | 5/1988 |

OTHER PUBLICATIONS

A. Sjögren et al., "Connection of Optical FIbers Embeded in Aircraft Composite Components", Proc. of SPIE vol. 3985, Smart Structures and Integrated Systems, ed. N. Wereley, Mar. 2000, pp. 533–542.

* cited by examiner

Primary Examiner—Chandrika Prasad
(74) Attorney, Agent, or Firm—Oliff & Berridge, PLC

(57) ABSTRACT

A connection structure of a light transfer medium includes: a light transfer medium embedded in a structural body; and a protection tube in which the light transfer medium is inserted. The protection tube is embedded in the structural body at one end portion of the structural body. One end portion of the light transfer medium is inserted into the protection tube such that an end of the one end portion of the light transfer medium is positioned inwardly from one end face of the one end portion of said structural body.

15 Claims, 13 Drawing Sheets

EMBEDDED LIGHT TRANSFER MEDIUM WITH A PROTECTION TUBE AND AN ELASTIC COVERING

BACKGROUND OF THE INVENTION

1. Field of the Invention

The present invention relates to a connection structure for a light transfer medium which is embedded in a structural body of the connection structure and used for communication or a sensor, and a method of manufacturing the same.

2. Description of the Related Art

A structural body of a connection structure for a light transfer medium is structured so as to embed optical fiber which is a light transfer medium to transfer an optical signal. Further, the optical fiber embedded in the structural body makes it possible to detect changes of the optical signal transferred in the optical fiber such as changes in the light intensity and wave length. Thus, internal damage or distortion of the structural body can be detected.

The structural body is formed by overlaying and hardening prepreg (an abbreviation for pre-impregnated materials) sheets in the direction of the plate thickness. Each prepreg sheet is an intermediate base material to be formed, which is produced by pre-impregnating a reinforced fiber base material with matrix resin.

The structural body is formed in such a way that a plurality of prepreg sheets are laminated and formed as a precursor, and the precursor is bagged, decompressed, and deaerated and then formed and processed by heating and pressurizing by an autoclave. Thus, an intermediate product is formed and partially cut off, and the residual part is formed as a structural body. In the process of forming a structural body like this, optical fiber is embedded in the structural body.

The optical fiber embedded in the structural body is extended outwardly from the inside of the structural body beyond the end face of the structural body. The outwardly extended optical fiber, after forming of the structural body, is connected to optical related devices such as a light source and a light measuring instrument. As a conventional art for outwardly extending the optical fiber from the inside of the structural body, there is a method of outwardly extending the embedded optical fiber directly from the end of the structural body available.

FIG. 14 is a sectional view showing the state of decompression and deaeration of a bagged precursor 21 before heating and pressurization. A manufacturing method of a structure for outwardly extending optical fiber directly from a structural body will be explained with referring to FIG. 14. The precursor 21 is covered with a bagged film 23 composed of a nylon film and a storage space 26 for storing the precursor 21 is airtightly sealed by a vacuum bagging seal material 24. The storage space 26 is evacuated by a vacuum pump not shown in the drawing and deaerated through a evacuation hose 27.

As the space 26 storing the precursor 21 is deaerated, a pressurizing sheet 28 composed of an aluminum sheet or an FRP (fiber reinforced plastics) sheet presses the surface of the precursor 21, and the precursor 21 is put into an autoclave in such a state, and the storage space 26 is heated and pressurized, and the precursor 21 is formed by a jig 29, the pressuring sheet 28, and a dam 25.

When optical fiber 22 is extended directly from the side of the precursor 21, the optical fiber 22 may be damaged during evacuation in the neighborhood of the side of the precursor 21. Further, when the length of the optical fiber 22 outwardly extended from the precursor 21 is short, during heating and pressurizing, there is the possibility that resin may flow out from the precursor 21 and the resin may reach one end of the optical fiber 22.

To solve such a problem, an art for covering the part of the optical fiber outwardly extended from the precursor 21 with a pipe is conventionally considered. This conventional art will be explained by referring to FIGS. 15 and 16.

FIG. 15 is a perspective view showing the structure of another conventional art in which optical fiber 3 is outwardly extended from the end face thereof. In a structural body 1, a tube 4 having a circular cross section made of Teflon (R) having a projection 4a projected out of one side 2 is installed. The optical fiber 3 embedded in the structural body 1 passes through the tube 4 and extends outwardly from the structural body 1. By doing this, the optical fiber 3, during evacuation, can be prevented from damage to the outwardly extended part thereof. Further, there is a case that an embedding type connector is embedded in place of the tube 4.

FIG. 16 is a perspective view showing the structure of another conventional art in which optical fiber 6 is outwardly extended from the end face thereof. In a structural body 5, a tube 7 of a circular cross section having a projection 7a projected out of one surface 8 in the direction of the sheet thickness is installed. The optical fiber 6 embedded in the structural body 5 passes through the tube 7 and extends outwardly from the structural body 5. By doing this, in the same way as with the conventional art shown in FIG. 15, the optical fiber 6, during evacuation, is prevented from damage to the outwardly extended part of the optical fiber 6.

For an intermediate product in the state after heating and pressurizing of the precursor, a trimming process of cutting off an unnecessary periphery is performed. The intermediate product subjected to the trimming process is formed as a structural body and the structural body is formed in a predetermined size. In the conventional structure in which the optical fiber 3 is outwardly extended shown in FIG. 15, due to the projection 4a of the tube 4 projected from the one side 2 of the structural body 1, the trimming process cannot be performed for the intermediate product in the state before forming the structural body and a problem arises that it is difficult to form the structural body in the predetermined size.

Further, when an embedding type connector is to be embedded in place of the tube 4, since the volume of the embedding type connector is larger than that of the tube 4, an another problem arises that the thickness of the structural body at the part of the structural body where the embedding type connector is embedded becomes smaller. Thus, a remarkable reduction in the strength of the structural body 1 is caused. When the problem of the strength reduction is solved by thickening the thickness of the structural body at the part where the connector is embedded, another problem arises that the connector embedding part of the structural body requires padding up, that is, an excess thickness.

Further, in the structure in which the optical fiber 6 is outwardly extended shown in FIG. 16, the projection 7a projected in the direction of the sheet thickness of the structural body 5 is formed, as aforementioned. In such a structure, in the state of decompression and deaeration of the precursor, since the projection 7a is projected on the surface 8 in the direction of the sheet thickness, a problem arises that it is difficult to press the side of the precursor in the direction of the sheet thickness which is the surface to be pressed by the pressurizing sheet 28 shown in FIG. 14 so as to make it flat.

Further, when in the state that the optical fiber 3 is outwardly extended directly from the side of the intermediate product, the optical fiber 3 is to be trimmed and cut, the end face of the optical fiber 3 is damaged by the trimming process. Therefore, after the trimming process, the end face of the optical fiber 3 must be ground. As mentioned above, since a step of grinding the end face of the optical fiber 3 is required after the intermediate product is trimmed, a problem arises that the manufacturing process is complicated and the optical fiber 3 cannot be easily connected to another optical fiber.

Further, as shown in FIG. 14, in the state of decompression and deaeration of the precursor, in order to prevent one end of the optical fiber 22 from being covered with resin, when the one end of the optical fiber 22 is extended out from the bagged film 23 using the tube 4 or 7 shown in FIG. 15 or 16, a gap is inevitably formed between the tube 4 or 7 for protecting the optical fiber 22 and the vacuum bagging seal material 24 shown in FIG. 14, and poor deaeration is caused, and defective formation of the precursor is caused.

Further, as mentioned above, when the optical fiber is to be extended out from the structural body, in order to ensure the length necessary to connect to the light measuring instrument, the optical fiber 22 is lengthened. When the optical fiber 22 is lengthened, the handling thereof becomes difficult and as compared with a case of no-existence of the optical fiber 22, the operability of manufacturing of the structural body is reduced.

SUMMARY OF THE INVENTION

Therefore, an object of the present invention is to provide a connection structure of a light transfer medium and a method of manufacturing the same capable of easily being manufactured without causing damage to the light transfer medium embedded in a structural body. Another object of the present invention is to provide a connection structure of a light transfer medium and a method of manufacturing the same capable of making it easy to be connected to an external light transfer medium.

According to the present invention, a connection structure of a light transfer medium comprises: a light transfer medium embedded in a structural body; and a protection tube in which said light transfer medium is inserted, said protection tube is embedded in said structural body at one end portion of said structural body, wherein one end portion of said light transfer medium is inserted into said protection tube such that an end of said one end portion of said light transfer medium is positioned inwardly from one end face of said one end portion of said structural body.

Preferably, the connection structure of a light transfer medium further comprises a holding sleeve inserted into said protection tube, wherein said holding sleeve elastically holds said one end portion of said light transfer medium and also can elastically hold another light transfer medium to be inserted from an outside of said structural body so that a central axis of said light transfer medium and a central axis of said another light transfer medium are aligned with each other.

Preferably, said holding sleeve has a substantially C-shaped cross section.

Preferably, said holding sleeve is inserted into said protection tube with a gap therebetween.

Preferably, said holding sleeve is fit into said protection tube.

Preferably, said light transfer medium includes: an optical fiber, a ferrule for covering one end of said optical fiber, and a covering member covering a transitional part of an exposed part of said optical fiber extended from said ferrule to suppress a displacement of said transitional part which is located adjacent to said ferrule.

Preferably, said covering member surrounds said transitional part of said optical fiber in contact relationship.

Preferably, said covering member surrounds said transitional part of said optical fiber in non-contact relationship.

Preferably, said one end portion of said light transfer medium has a slant end face.

According to the present invention, a method of manufacturing a connection structure of a light transfer medium comprises: inserting one end portion of a light transfer medium into a protection tube so that an end of said one end portion of said light transfer medium is positioned inwardly from one end face of said protection tube; embedding at least a part of said protection tube and said light transfer medium in a precursor such that said end of said one end portion of said light transfer medium is positioned inwardly from one end face of said precursor; and heating and pressurizing said precursor in which said at least a part of said protection tube and said light transfer medium are embedded.

Preferably, the method of manufacturing a connection structure of a light transfer medium, further comprises: attaching a holding sleeve to said one end portion of said light transfer medium before inserting said one end portion of said light transfer medium into said protection tube; wherein said holding sleeve is inserted into said protection tube.

Preferably, said holding sleeve has a substantially C-shaped cross section so as to hold said one end portion of said light transfer medium elastically.

Preferably, said holding sleeve is inserted into said protection tube with a gap therebetween.

Preferably, said holding sleeve is fit into said protection tube.

Preferably, said protection tube is partially projected from one end of said precursor after said embedding step, wherein, after said heating and pressurizing step, said precursor and said protection tube are cut such that said end of said end portion of said light transfer medium is still positioned inwardly from a newly formed end face of said precursor.

Preferably, said precursor comprises laminated thermoset prepreg sheets.

According to the present invention, the light transfer medium does not obstruct the action of the manufacturing device for processing the structural body, so that the structural body can be easily manufactured. By doing this, without using a particular device and method, by an existing device and method, in the same way as with the structural body with no light transfer medium embedded, the structural body with the light transfer medium embedded can be manufactured.

Further, for one end face of the light transfer medium embedded in the structural body, the process of grinding the end face after manufacture of the structural body can be eliminated. Further, the possibility of causing damage to the light transfer medium is eliminated during processing of the structural body, thus the reliability of the light transfer medium can be improved. Further, the light transfer medium embedded in the structural body can be easily connected in a removable state by inserting the end of another light transfer medium into the protection tube after manufacture of the structural body. Therefore, in the connection structure of the light transfer medium of the present invention, there is no need to embed an embedding type connector in the structural body. Namely, the constitution of the connection structure approaches the constitution of a structural body to be practically used. The structural body can be prevented from enlargement due to forming of an excess thickness. The lightweight and miniaturization can be realized. The effect of embedding of the light transfer medium on the mechanical characteristics of the structural body can be reduced.

Further, according to the present invention, the central axial line of the light transfer medium embedded in the structural body and the central axial line of another light transfer medium inserted into the protection tube from the outside of the structural body can coincide with each other, so that the light loss of the connection structure part can be reduced. Furthermore, the light transfer media are prevented from a connection error, thus the reliability can be improved.

Further, according to the present invention, the optical fiber can be prevented from bending in the neighborhood of the ferrule by the covering member. By doing this, the light transfer medium can be prevented from being damaged and during transport and embedding of the light transfer medium, the light transfer medium can be prevented from being damaged.

Further, according to the present invention, the light transfer medium can be easily fit into the holding sleeve and embedded in the precursor. Further, an end of the light transfer medium is positioned in the precursor, so that the intermediate product after forming the precursor can be trimmed. By doing this, the side of the structural body can be formed smoothly and the size accuracy of the structural body can be improved.

Further, the light transfer medium can be prevented from being damaged due to trimming, so that the reliability of the light transfer medium can be improved. Further, there is no need to grind again the face of an end of the light transfer medium after trimming. By doing this, the light transfer medium embedded in the structural body can be easily connected to an external light transfer medium.

DESCRIPTION OF THE PREFERRED EMBODIMENTS

Figure 1:
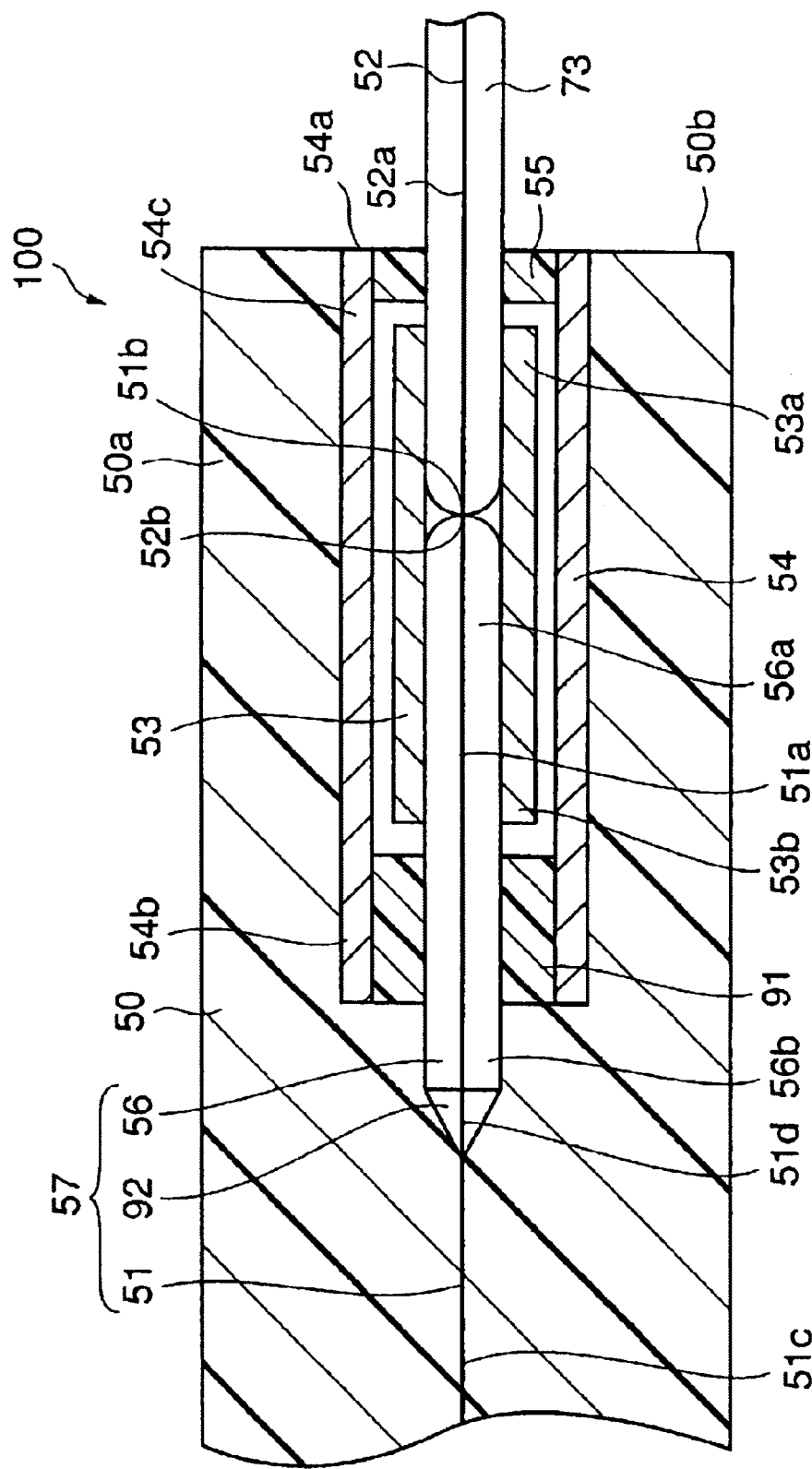
FIG. 1 is a sectional view showing a connection structure of a light transfer medium embedded in a structural body of the connection structure as an embodiment of the present invention.

FIG. 1 is a sectional view showing a connection structure 100 of a light transfer medium 57 embedded in a structural body 50, as an embodiment of the present invention. The light transfer medium 57 is embedded in the structural body 50. The light transfer medium 57 includes optical fiber 51, a ferrule 56, and a covering member 92. The optical fiber 51 embedded in the structural body 50 is connected to another external optical fiber 52 inserted into the structural body 50 from the outside in a light transferable state and transfers a light signal. For example, the optical fiber 51 and the external optical fiber 52 are physically connected by making a face-to-face relationship with each other.

The connection structure 100 of the light transfer medium 57 has a protection tube 54 embedded in the structural body 50, a holding sleeve 53, and the light transfer medium 57. In the optical fiber 51 which is an element of the light transfer medium 57, the ferrule 56 is mounted at one end 51a of the optical fiber 51 so as to hold and fix the optical fiber 51 to the holding sleeve 53. The ferrule 56 is formed in a cylindrical shape and covers the outer peripheral part of the one end 51a of the light transfer medium 51. Further, the covering member 92 covers a transitional part 51d which is defined as a proximal portion, i.e., a portion located in a neighborhood of the ferrule 56, of an exposed part 51c of the optical fiber 51 exposed from the ferrule 56. The covering member 92 is composed of an elastic material. The term "elastic" used in this specification is a functional expression having elasticity and recoverability. The covering member 92 is formed in a conical shape in which the exposed part 51c of the optical fiber passes on the central axial line thereof. The bottom face of the covering member 91 and the end face of another end 56b of the ferrule 56 are in contact with each other so as to cover the transitional part 51d. By doing this, the displacement of the transitional part 51d on the side of the other end of the ferrule 57 from the ferrule 57 can be suppressed.

The ferrule 56 is inserted into the holding sleeve 53 from the side of another end 53b of the holding sleeve 53 and an end 56a of the ferrule 56 is inserted up to almost the center position of the holding sleeve 53 in the longitudinal direction. The holding sleeve 53 holds the outer peripheral part of the ferrule 57 inserted therein by pressing almost the overall periphery inwardly.

The holding sleeve 53 has a cross section of substantially C shape and is formed almost cylindrically. Namely, the holding sleeve 53 has a slit-shaped notch passing through a wall of the holding sleeve 53 in the radial direction. The holding sleeve 53 is formed in a substantially cylindrical shape in which the notch is extended between both ends thereof in the longitudinal direction. The holding sleeve 53 can be deformed easily in the radial direction due to the notch and is flexible and elastic in the radial direction, that is, the direction perpendicular to the axial line L1.

The inner diameter of the holding sleeve 53 is equal to or slightly smaller than the outer diameter of the ferrule 56. Therefore, when the light transfer medium 57 is inserted into the holding sleeve 53, the holding sleeve 53 is slightly deformed, makes contact with the outer peripheral surface of the ferrule 56, and holds the light transfer medium 57.

The holding sleeve 53 holding the ferrule 56 is inserted from the side of another end 54b of the protection tube 54 in the direction of the axial line. The holding sleeve 53 is arranged so as to form a gap against the protection tube 54 in the radial direction. Further, the holding sleeve 53 is formed shorter than the protection tube 54 in the direction of the axial line and positioned in the protection tube 54 such that any portion of the holding sleeve 53 is not outwardly extended from the ends 54b and 54c of the protection tube 54.

The end 56a of the ferrule 56 is held by the holding sleeve 53 and the other end 56b of the ferrule 56 is projected from the other end 54b of the protection tube 54. In the protection tube 54, an adhesive 91 is filled so as to block the opening on the side of the other end 54b. As the adhesive 91, an adhesive well-suited to the base material of the structural body 50, the ferrule 56, and the protection tube 54, that is, of good wettability or attachability is selected. By the adhesive 91, the ferrule 56 is fixed to the protection tube 54. The adhesive 91 does not reach the holding sleeve 53 arranged in the protection tube 54 and blocks the gap between the inner periphery of the other end 54b of the protection tube 54 and the outer periphery of the ferrule 56.

The protection tube 54 with the ferrule 56 fixed by the adhesive 91 is embedded in an end 50a of the structural body 50. An end face 54a of the protection tube 54 in the direction of the axial line is made flush with an end face 50b of the structural body 50. The protection tube 54 is extended in the direction almost perpendicular to the direction of the thickness of the structural body 50. The protection tube 54 and the holding sleeve 53 are composed of, for example, a metal or ceramics. Specifically, materials for the protection tube 54 are selected so that the temperature at which the strength of the materials is greatly reduced is higher than the predicted temperature during manufacturing the precursor of the structural body 50, the destruction strength of the materials is higher than the predicted stress at the time of forming the structural body 50 from the precursor, and the coefficient of thermal expansion of the materials is small. By doing this, the one end 51a of the optical fiber 51 can be protected against pressurizing during forming the structural body 50 from the precursor. Further, the one end 51a of the optical fiber 51 can be prevented from deformation against heating during forming the structural body 50 from the precursor.

Further, the other end 56b of the ferrule 56 is partially exposed from the protection tube 54, embedded in the structural body 50, and directly makes contact with the structural body 50. The one end 51a of the optical fiber 51 is arranged in the structural body 50 so as to be positioned inwardly from the one end face 50b of the structural body 50 and the one end face 54a of the protection tube 54 in the direction of the axial line. Further, the other external optical fiber 52 positioned outside the structural body 50 is inserted from the one end face 54a of the protection tube 54. The external optical fiber 52 has substantially the same constitution as that of the optical fiber 51 embedded in the structural body 50. A ferrule 73 covers one end 52a of the external optical fiber 52. The ferrule 73 covering the one end 52a of the external optical fiber 52 has the same outer diameter as that of the ferrule 56 of the embedded light transfer medium 57. The ferrule 73 covering the external optical fiber 52 is inserted into the holding sleeve 53 from an end 53a of the holding sleeve 53 so that an end face 52b of the of the external optical fiber 52 makes a face-to-face relationship with the one end face 51b of the embedded optical fiber 51. The ferrule 73 covering the one end 52a of the external optical fiber 52 extending in the protection tube 54 from the outside of the structural body 50 is fixed to the protection tube 54 by an adhesive 55. The adhesive 55, which blocks the opening on the side of the one end 54c of the protection tube 54, does not reach the holding sleeve 53 arranged in the protection tube 54, and is filled in the gap between the inner periphery of the one end 54c of the protection tube 54 and the outer periphery of the ferrule 73. Further, as another example, the ferrule 73 covering the one end 52a of the external optical fiber 52 may be held by the holding sleeve 53 in a removable state.

The ferrule 73 covering the external optical fiber 52 is held by the holding sleeve 53 free of play, so that the optical axis of the optical fiber 51 embedded in the structural body 50 can coincide with the optical axis of the external optical fiber 52. The optical fibers 51 and 52 are connected in a light transferable state by making the end faces 51b and 52b contact with each other. Further, in the space specified by the holding sleeve 53, a matching agent is filled up.

The ferrule 56 and the protection tube 54 are fixed by the adhesive 91, thus in the structural body manufacturing process, during heating and pressurizing of the precursor, fused resin can be prevented from reaching the holding sleeve 53 and the one end 56a of the ferrule 56. By doing this, resin can be prevented from penetrating between the ferrule 56 and the holding sleeve 53 and the axial line of the ferrule 56, the optical fiber 51, and the protection tube 54 can be prevented from shifting. By doing this, the optical axis matching function of the holding sleeve 53 can be kept and the light transfer function of the optical fiber parts making contact with each other in the holding sleeve 53 can be prevented from losing.

Further, the ferrule 56 embedded in the structural body 50 and the ferrule 73 covering the external optical fiber 52 are respectively fixed to the protection tube 54 by the adhesives 91 and 55, so that even if the structural body 50 is given a shock, the displacement of the two optical fibers 51 and 52 with the respective ends 51b and 52b in the face-to-face relationship with each other can be prevented and the optical axis matching function of the holding sleeve 53 can be kept more surely. Further, since the two optical fibers 51 and 52 are fixed in a mutual contact state, the optical fibers will not be separated from each other and the light transfer function can be prevented more surely from losing.

Figure 2:
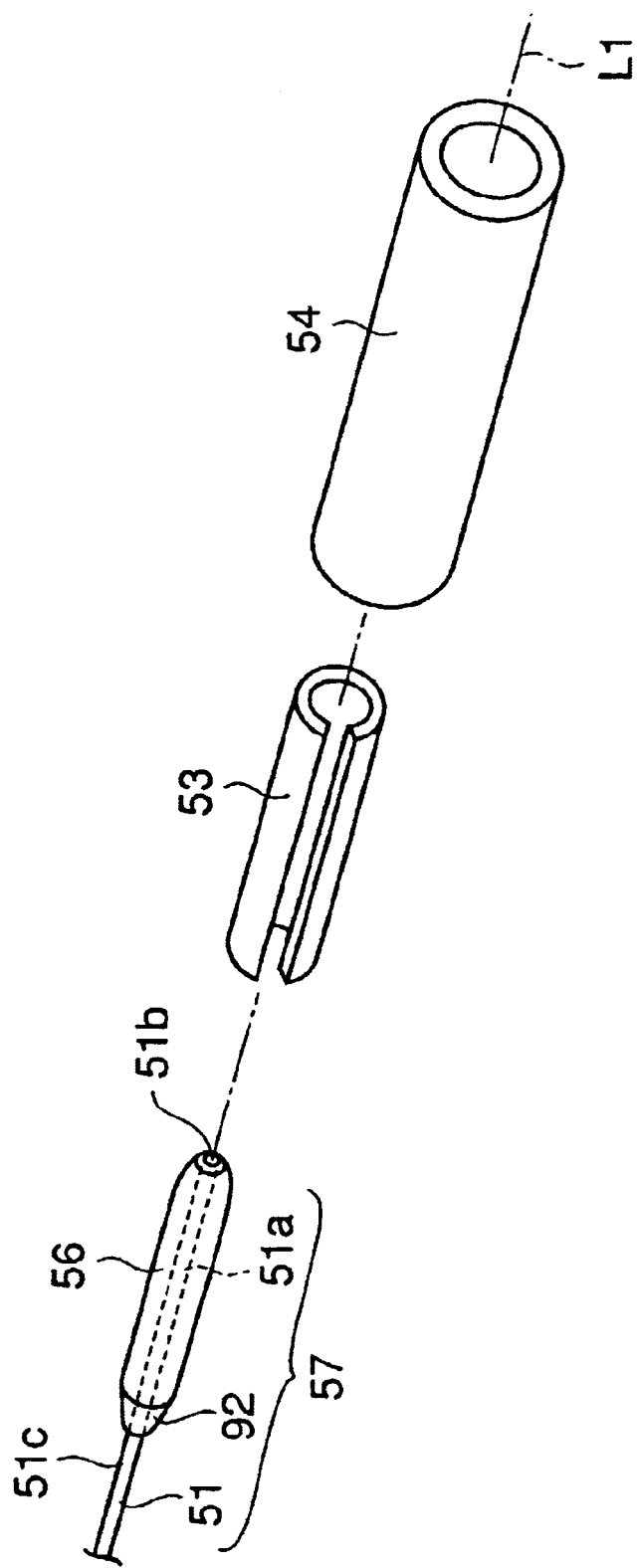
FIG. 2 is an exploded perspective view showing an optical fiber, a holding sleeve, and a protection tube of the embodiment of the present invention.

FIG. 2 is an exploded perspective view showing the optical fiber 51, the holding sleeve 53, and the protection tube 54. In the optical fiber 51, the ferrule 56b installed at the one end 51a thereof is held by the holding sleeve 53 and the holding sleeve 53 is inserted into the protection tube 54. At this time, the axial line of the optical fiber 51 and the axial line of the holding sleeve 53 are formed on the same axis L1 and the holding sleeve 53 is inserted into the protection tube 54 with forming a gap therebetween. Further, the ferrule 56 and the protection tube 54 are fixed by the adhesive 91.

Figure 3:
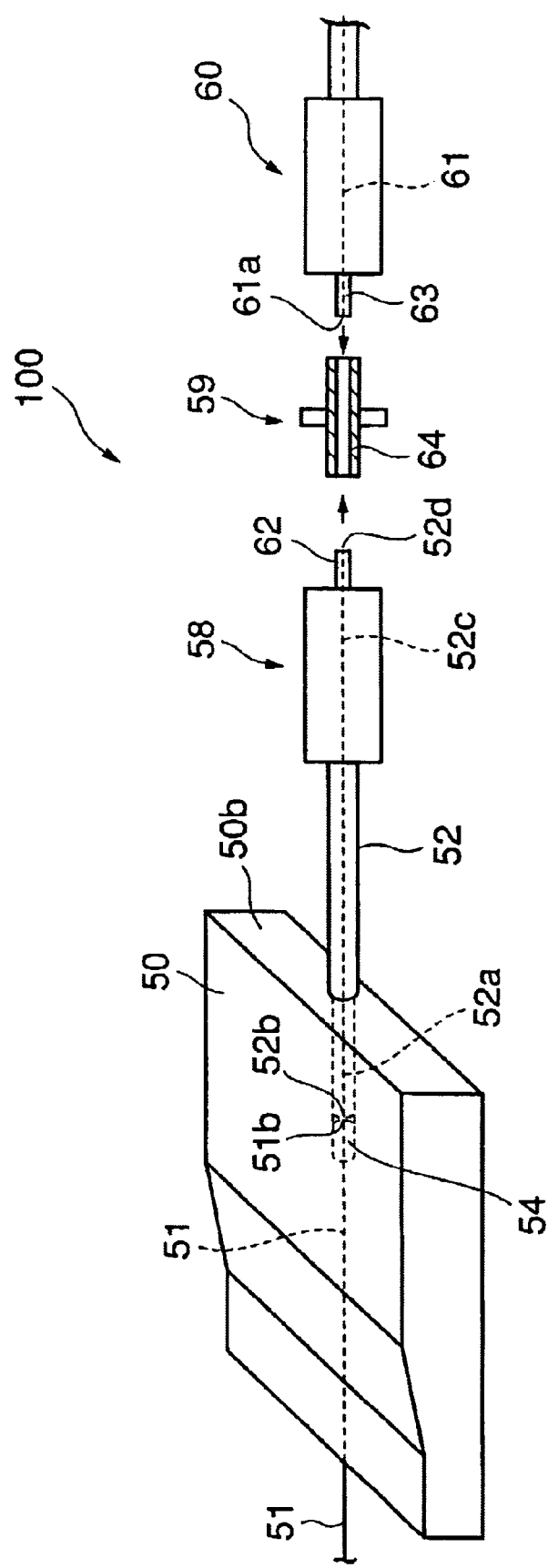
FIG. 3 is a perspective view showing an application example of the connection structure of the embodiment of the present invention.

FIG. 3 is a perspective view showing an application example of the connection structure 100 of the embodiment of the present invention. The one end face 51b of the optical fiber 51 embedded in the structural body 50 and the one end face 52b of the external optical fiber 52 which is another optical fiber are connected by mutually making a face-to-face relationship with each other in the holding sleeve 53 in a light transferable state. The ferrule 73 covering the external optical fiber 52 to stably transfer light as described above is adhered and fixed to the protection tube 54. Further, the external optical fiber 52 is connected to another external optical fiber 61.

The external optical fiber 52 is extended outside the structural body 50 and a plug 58 which is a male connector is formed at the other end 52c. At the leading edge of the plug 58, a ferrule 62 is formed and projected. At an end of the other external optical fiber 61, a plug 60 which is a male connector is formed. At the leading edge of the plug 60, a ferrule 63 is formed and projected.

The external optical fiber 52 and the other external optical fiber 61 are connected to an adapter 59 which is a female connector having a sleeve 64. The sleeve 64 is a tubular ferrule lining member used for optical fiber connection and the ends of the ferrules 62 and 63 inserted from both ends of the sleeve 64 are arranged coaxially. Thus, ends 52d and 61a of the external optical fibers 52 and 61 can be made contact with each other. The ends 52d and 61a of the plugs 58 and 60 are connected by the adapter 59 like this, thus the external optical fibers 52 and 61 can be connected in a mechanically removable state. By doing this, the external optical fibers 52 and 61 can be connected in a light transferable state.

For the shape, size, and accuracy of the plugs 58 and 60 and the adapter 59, for example, the existing optical connector standard (JIS C 5983, F14 Type Optical Fiber Connector) is required. Size and materials which are not specified by the standard can be changed depending on an application environment and are not particularly designated.

Figure 4:
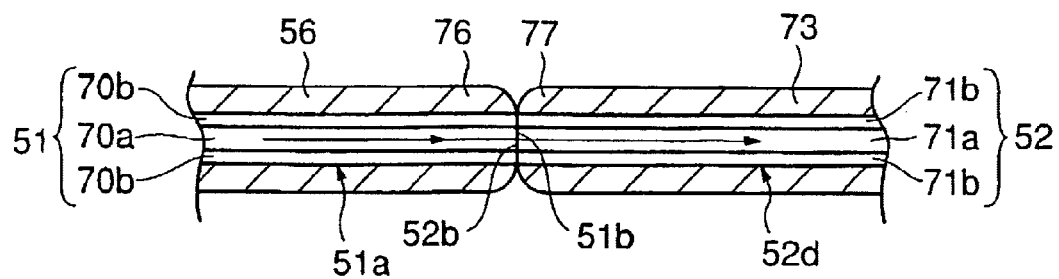
FIG. 4 is a sectional view showing optical fibers connected in a light transferable state and ferrules covering the optical fibers in the embodiment of the present invention.

FIG. 4 is a sectional view showing the optical fibers 51 and 52 connected in a light transferable state and the ferrules 56 and 73 covering the one ends 51a and 52a of the optical fibers 51 and 52 in the present invention. In FIG. 4, light travels to the right. The optical fibers 51 and 52 have cores 70a and 71a and clads 70b and 71b through which light passes. The materials of the cores 70a and 71a and the clads 70b and 71b are, for example, light-transmissible quartz or resin and the material of the ferrules 56 and 73 is, for example, zirconea ceramics.

The optical fibers 51 and 52 are in a light transferable state that the end faces are in contact with each other and light passes from the one face 51b of the optical fiber 51 to the other face 52b of the optical fiber 52. Therefore, the contact faces of the optical fibers 51 and 52 are respectively a light outlet surface 51b and a light inlet surface 52b. The light outlet surface 51b and the light inlet surface 52b are formed perpendicularly to the axial lines of the optical fibers 51 and 52. Further, a light outlet end 76 and a light inlet end 77 of the ferrules 56 and 73 are formed in an almost semispherical shape. By doing this, the light outlet surface 51b and the light inlet surface 52b can make contact with each other, and the optical fibers 51 and 52 can be connected in a light transferable state, and an optical connection error can be prevented. The light outlet surface 51b and the light inlet surface 52b of the optical fibers 51 and 52 are ground.

Since the ferrules 56 and 73 are formed in a semispherical shape, existence of air is prevented, thus the Fresnel reflection between the fibers can be prevented. By preventing the Fresnel reflection, the reflection attenuation is prevented from reduction, thus the connection loss can be reduced.

Practically, the optical fibers 51 and 52 are connected in physical contact (PC) with each other. Namely, the optical fibers make a face-to-face relationship with each other and make contact with each other and moreover the ferrules 56 and 73 are loaded and pressed, so that the optical fibers 51 and 52 and the ferrules 56 and 73 installed around them are elastically deformed and connected. By doing this, even if tension, vibration, and temperature changing are caused to the optical fibers 51 and 52, it can be easily prevented to form a gap between the fibers.

As mentioned above, according to this embodiment, the one end 51a of the optical fiber 51 is positioned inwardly from the one end face 50a of the structural body 50 and arranged in the structural body 50, so that even if one end of the structural body 50 is processed, the optical fiber 51 and processing tool do not make contact with each other and further during transport of the structural body 50, the one end face 51b of the optical fiber 51 can be protected. By doing this, the one end face 51b of the optical fiber 51 is prevented from being damaged, thus the grinded state formed on the one end face 51b can be kept.

When the optical fiber 51 embedded in the structural body 50 and the external optical fiber 52 are to be connected, there is no need to grind again the one end face 51b of the embedded optical fiber 51 and the optical fiber 51 can be easily connected to the external optical fiber 52 in a light transferable state.

Further, the optical fiber 51 embedded in the structural body 50 and the external optical fiber 52 are connected in a light transferable state after forming of the structural body 50, thus in the structural body forming process, the optical fiber 51 will not be extended outside and no obstacles are caused to the manufacture and transport of the structural body 50. Further, the one end 51a of the optical fiber 51 and the holding sleeve 53 are arranged in the non-elastic protection tube 54, so that the one end 51a of the optical fiber 51 is prevented from deformation, thus the one end 51a of the optical fiber 51 can be prevented from being damaged. Further, the holding sleeve 53 is inserted into the protection tube 54 with forming a gap therebetween, so that movements of the holding sleeve 53 in the radial direction are not restricted, thus the one end 51a of the optical fiber 51 can be held surely in an elastic state by the holding sleeve 53.

Further, the one end 51a of the optical fiber 51 is a connection part of the optical fibers 51 and 52, and the optical fibers 51 and 52 are connected inside the protection tube 54. By doing this, at the connection part of the optical fibers 51 and 52, the movement other than in the axial line direction of the protection tube 54, that is, other than in the removable direction of the optical fiber 52 is restricted. By doing this, the central axial lines of the optical fibers 51 and 52 connected in the protection tube 54 can easily coincide with each other, and without using an embedding type connector, the optical fibers 51 and 52 can be connected to each other. Further, the optical fibers 51 and 52 are prevented from a connection error, thus the reliability can be improved. Therefore, compared with a case that an embedding type connector is embedded in the structural body, the part to be embedded in the structural body 50 can be made smaller in volume and the effect on the mechanical characteristics of the structural body 50 can be reduced.

Further, the optical fiber 51 is inserted into the protection tube 54 in a state that it is held in the holding sleeve 53 of a substantially C-shaped cylinder. Since the holding sleeve 53 is formed to have a substantially C-shaped cross section, it is flexible and elastic and makes contact with the almost overall peripheral surface of the one end 51*a* of the optical fiber 51. Further, the holding sleeve 53 is inserted into the protection tube 54 with a gap therebetween, thus the holding sleeve 53 can easily deform in the radial direction and can easily hold the ferrule 56.

Generally, the optical fiber 51 is made thin, so that the deformation of the holding sleeve 53 for holding the optical fiber 51 is very minute. Therefore, even if the optical fiber 51 is inserted into the protection tube 54 via the holding sleeve 53, it is deformed just slightly, thus the central axial line of the optical fiber 51 can be arranged almost coaxially with the central axial line of the holding sleeve 53. Further, the central axial line of the optical fiber 51 embedded in the structural body 50 can coincide with the central axial line of another external optical fiber to be inserted into the holding sleeve 53 from the outside of the structural body 50. By doing this, the optical fibers 51 and 52 are prevented from a connection error, thus the reliability can be improved moreover.

Further, the ferrules 56 and 73 respectively covering the optical fibers 51 and 52 are adhered and fixed to the protection tube 54 by the adhesives 91 and 55, so that they can be fixed to the structural body 50 more integratedly. By doing this, even when great vibration or shock is given to the structural body 50, the optical fibers 51 and 52 are prevented from cancellation of the connection and an optical signal can be transferred surely.

Further, the protection tube 54 has no formed slit and in the structural body manufacture process, the openings at both ends of the protection tube 54 are blocked, thus during heating and pressurizing of the precursor, fused resin can be prevented from penetrating into the protection tube 54 in the radial direction and axial line direction of the protection tube 54. By doing this, the central axial lines of the holding sleeve 53 and the ferrule 56 held by the holding sleeve 53 can be prevented from shifting. Fused resin will not be adhered to the holding sleeve 53, so that the holding sleeve 53 is not prevented from deformation, thereby can be kept flexible. Further, no resin is attached to the ferrules 56 and 73 and the optical fibers 51 and 52 which are stored in the protection tube 54, and the ferrules 56 and 73 and the optical fibers 51 and 52 can be protected.

Further, the covering member 92 covers the transitional part 51*d* of the exposed part 51*c* of the optical fiber 51 on the side of the other end of the ferrule 56 and can suppress the displacement of the transitional part 51*d* of the optical fiber 51 with respect to the ferrule 56. By doing this, the optical fiber 51 can be prevented from curving with a small curvature radius. Therefore, the optical fiber 51 can be prevented from bending and even if unreasonable force is generated in the optical fiber 51 and the ferrule 56, the optical fiber 51 is prevented from bending, thus the optical fiber 56 can be prevented from damage.

Further, the space specified by the protection tube 54 around the end faces 51*b* and 52*b* of the optical fibers 51, 52 is filled with a matching agent. By doing this, the connection loss of the optical fibers 51 and 52 can be reduced. Further, as indicated in the connection structure 100 shown in FIG. 3, by use of the external optical fiber 52 which is connected to the one end 51*a* of the optical fiber 51 and has the plug 58 formed at the other end 52*c*, the connection structure can be easily connected to an optical circuit element.

Further, the plugs 58 and 60 and the adapter 59 are based on the size and accuracy specified in Japanese Industrial Standard (JIS), thus general purpose optical fiber parts on sale can be used and a connection structure can be formed with predetermined accuracy and at a low price.

Further, the tip of the ferrule 56 is formed convexly in a semispherical shape, thus the ferrule 56 can be connected in physical contact (PC). Namely, existence of air is prevented, thus the Fresnel reflection between the fibers can be prevented. By prevention of the Fresnel reflection, the reflection attenuation is prevented from reduction, thus the connection loss can be reduced.

When the optical fiber 51 is embedded in the structural body 50 like this, it can be used as a sensor on the basis of the characteristics of light propagating in the optical fiber 51. For example, the optical fiber 51 can be used as a sensor for detecting damage of the structural body 50, a sensor for detecting a shock given to the structural body 50, or a distortion and temperature sensor and can measure these amounts.

Figure 5A:
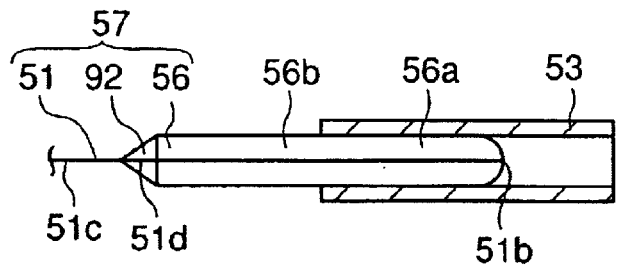
FIGS. 5A, 5B and 5C are sectional views showing a process up to embedding of a light transfer medium including the optical fiber, the holding sleeve, and the protection tube in a precursor as an embodiment of the present invention.
Figure 5B:
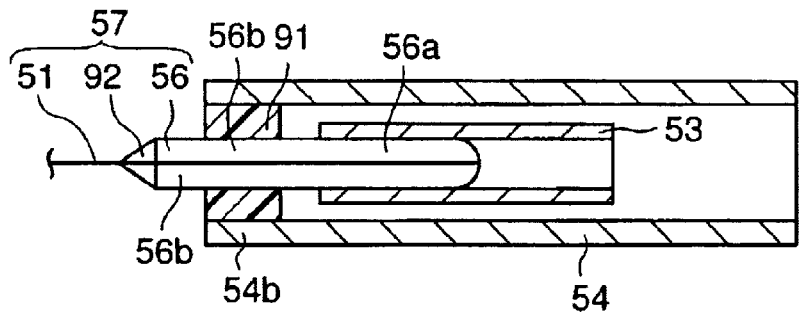
Figure 5C:
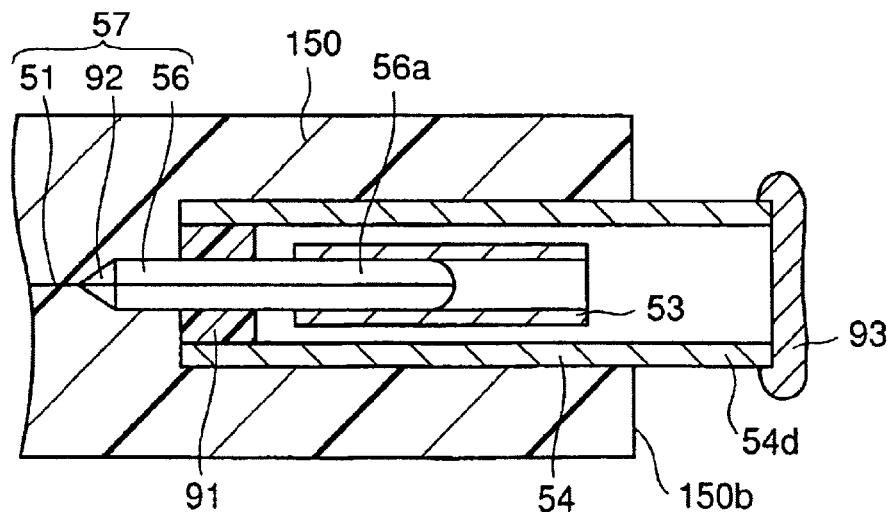
Figure 6A:
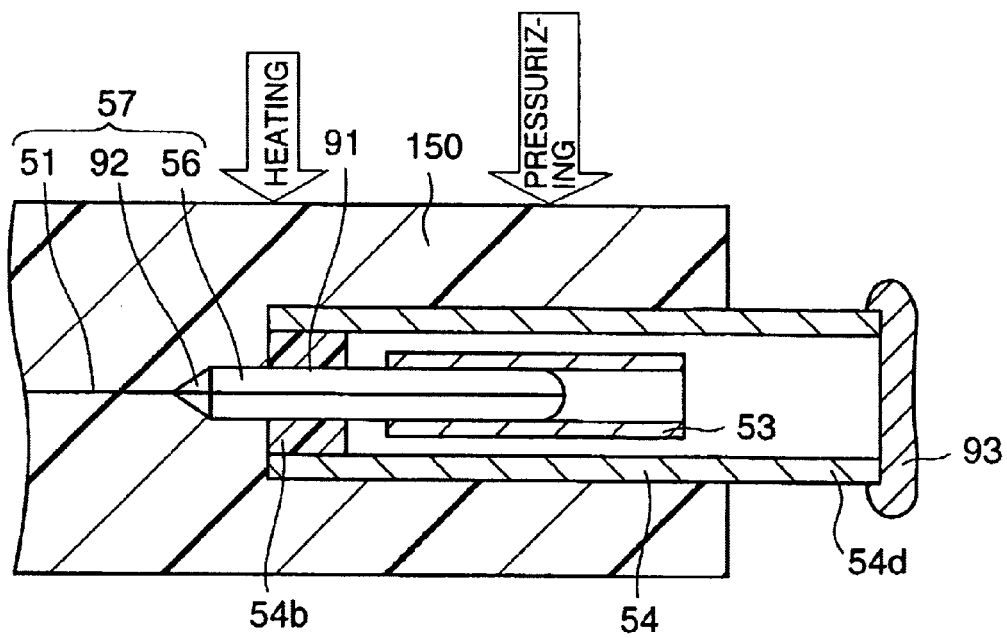
FIGS. 6A, 6B and 6C are sectional views showing a process of forming the precursor after embedding of the light transfer medium, the holding sleeve, and the protection tube as a structural body as an embodiment of the present invention.
Figure 6B:
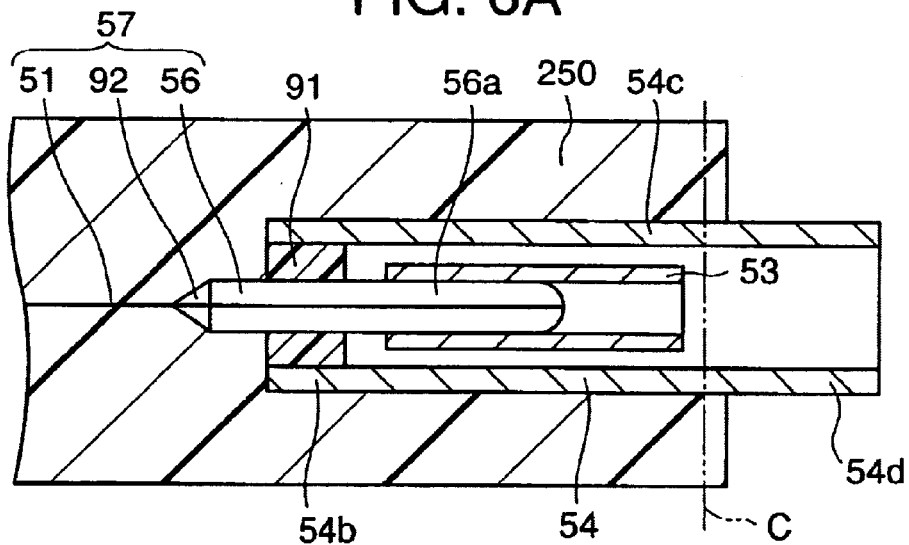
Figure 6C:
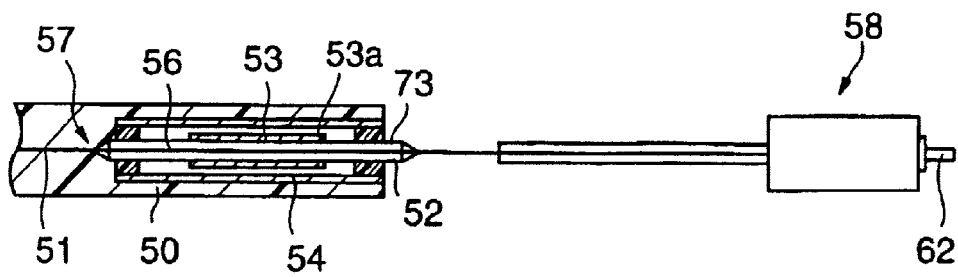
Figure 7:
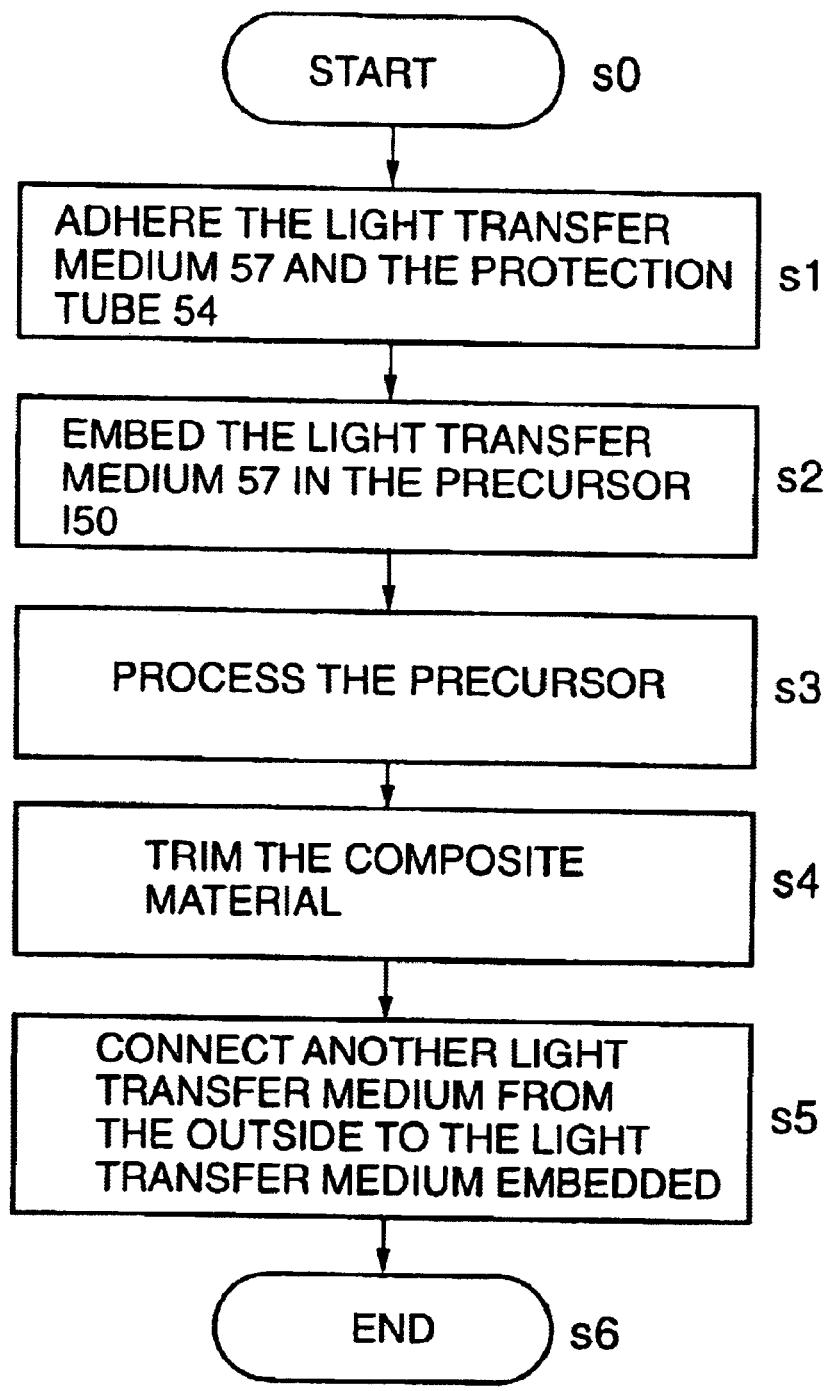
FIG. 7 is a flowchart showing manufacture of the structural body with the light transfer medium embedded therein and a connection process of the light transfer medium as an embodiment of the present invention.

FIGS. 5A to 6C are sectional views showing manufacture of the structural body 50 in which the light transfer medium 57 is embedded as the embodiment of the present invention and the connection process of the light transfer medium. FIGS. 5A to 5C show the process up to embedding of the light transfer medium 57, the holding sleeve 53, and the protection tube 54 in a precursor 150 and the process progresses in the order of FIG. 5A to FIG. 5C. Further, FIGS. 6A to 6C show the process of forming the precursor 150 after embedding of the light transfer medium 57, the holding sleeve 53, and the protection tube 54 as the structural body 50 and the process progresses in the order of FIG. 6A to FIG. 6C. Further, FIG. 7 is a flow chart showing manufacture of the structural body 50 in which the light transfer medium 57 is embedded as an embodiment of the present invention and the connection process of the light transfer medium 57.

Firstly, at Step S0, the component parts such as the light transfer medium 57, the holding sleeve 53, and the protection tube 54 are prepared. With respect to the light transfer medium 57, the holding sleeve 53, and the protection tube 54, minimum requirements for the size accuracy thereof may be such that the ferrule 56 can be fit into the holding sleeve 53 and the holding sleeve 53 can be inserted into the protection tube 54, and furthermore the central axial lines of the optical fibers can coincide with each other. For example, the inner peripheral diameter of the holding sleeve 53, when the holding sleeve 53 is not fit into the protection tube 54, that is, when it is not restricted in the radial direction, has accuracy of 1.249 mm or less.

For example, as preparation for the light transfer medium 57, the one end face 51b of the optical fiber 51 at which the ferrule 56 is mounted is ground and the tip of the ferrule 56 on the side of the one end 56a is formed in a semispherical shape. Further, the overall periphery of the transitional part 51d of the optical fiber 51 on the side of the other end 56b of the ferrule 56 is covered with the covering member 92 made of an elastic material. When the preparation for the component members is completed like this, the process goes to Step s1 and the embedding and connection process of the light transfer medium 57 is started.

At Step s1, as shown in FIG. 5A, in a state that the other end 56b of the ferrule 56 is projected from the holding sleeve 53, the one end 56a of the ferrule 56 is held by the holding sleeve 53 and the one end face 51b of the optical fiber 51 is arranged substantially at the center position of the holding sleeve 53.

Next, as shown in FIG. 5B, the light transfer medium 57 held by the holding sleeve 53 is inserted into the protection tube 54 and the holding sleeve 53 is arranged substantially at the center position of the protection tube 54. The holding sleeve 53 is formed shorter than the protection tube 54 and is positioned such that any part of the holding sleeve 53 is not projected from either end of the protection tube 54. The other end 56b of the ferrule 56 is projected in the direction of separating from the other end 54b of the protection tube 54. Next, the ferrule 56 is fixed to the other end 54b of the protection tube 54 by the heat resistant adhesive 91. Concretely, between the inner peripheral surface of the other end 54b of the protection tube 54 and the outer peripheral surface of the ferrule 56, the adhesive 91 is filled closely. By doing this, the ferrule 56 is integratedly fixed to the protection tube 54 free of play. At this time, the light transfer medium 57 and the protection tube 54 are arranged almost coaxially.

When the light transfer medium 57, the holding sleeve 53, and the protection tube 54 are integratedly fixed like this, the process goes to Step s2 and the embedding and connection process of the light transfer medium 57 is started.

Figure 14:
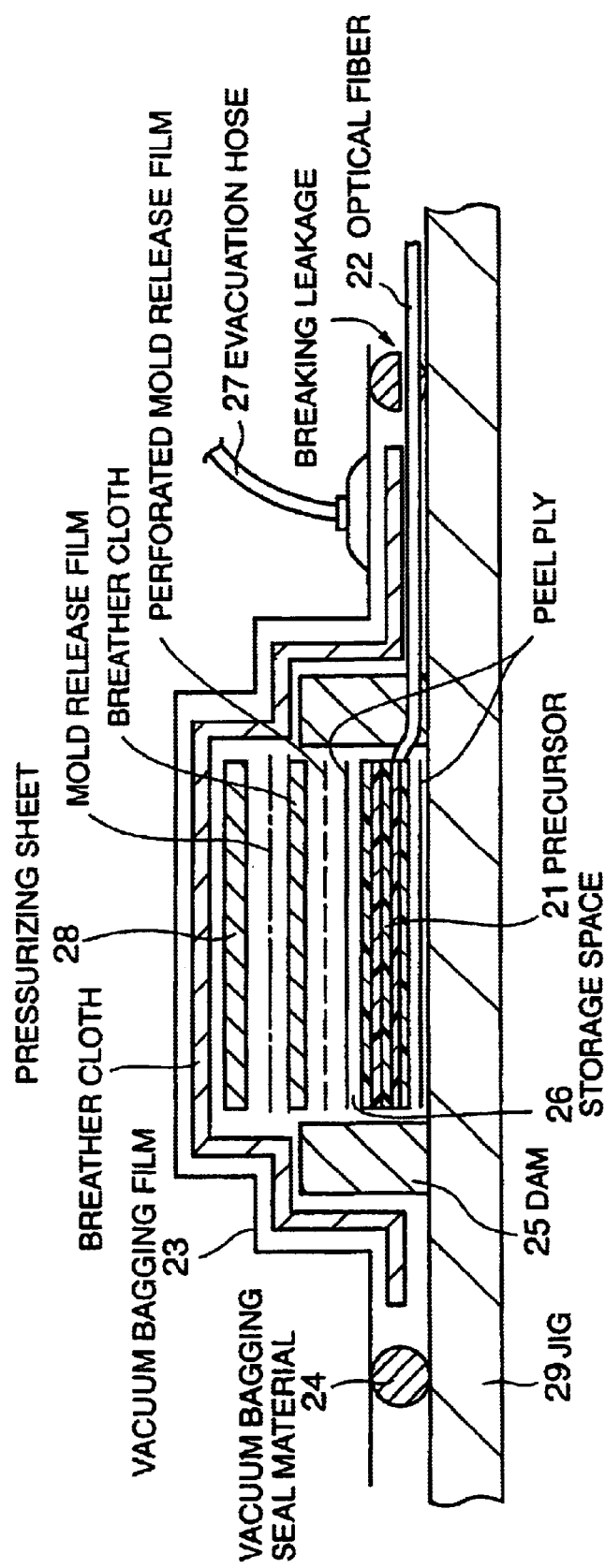
FIG. 14 is a sectional view showing a state of decompression and deaeration of a bagged precursor as a conventional art.
Figure 15:
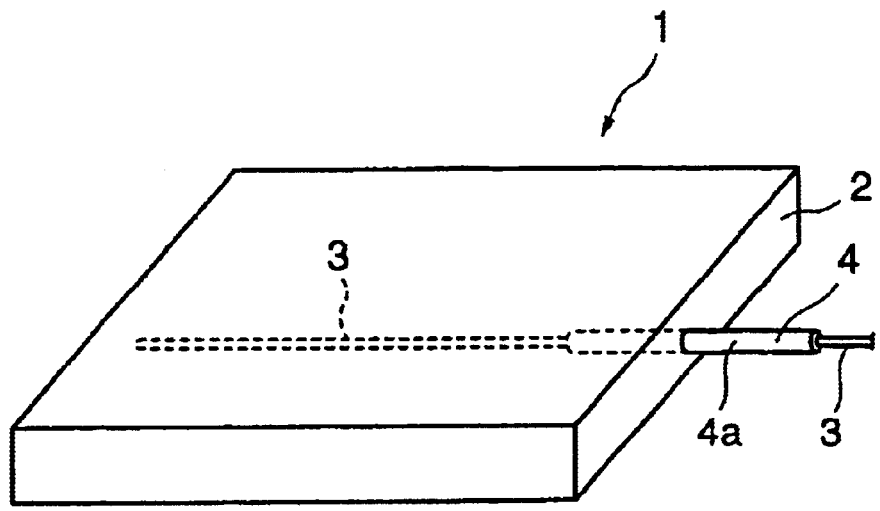
FIG. 15 is a perspective view showing a connection structure including a structural body in which an optical fiber is embedded as another conventional art.
Figure 16:
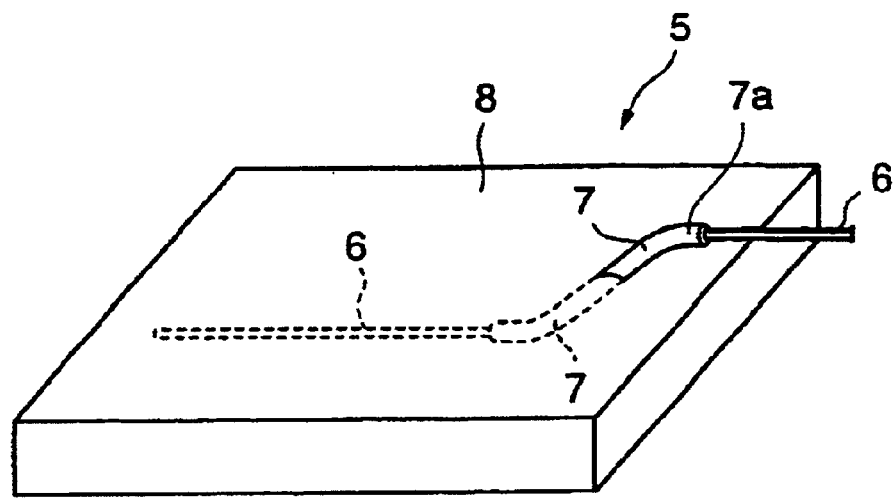
FIG. 16 is a perspective view showing a connection structure including a structural body in which an optical fiber is embedded as still another conventional art.

At Step s2, as shown in FIG. 5C, the light transfer medium 57, the holding sleeve 53, and the protection tube 54 integratedly fixed at Step s1 are embedded in the precursor 150. At this time, the one end face 51b of the optical fiber 51 and one end face of the holding sleeve 53 are positioned inwardly from an end face 150b of the precursor 150 and the one end 54b of the protection tube 54 is projected from the one end face 150b of the precursor 150. Next, the opening formed at the one end 54d of the protection tube 54 is blocked and in the same way as with the manufacturing method shown in FIG. 14, the vacuum bagging operation is performed and the process goes to Step s3.

When Step s2 is explained in detail, the precursor 150 is composed of laminated thermoset prepreg sheets. The precursor 150 is heated and pressurized by an autoclave and an intermediate product 250 is formed. The procedure for embedding the light transfer medium 57 in the precursor 150 will be explained hereunder. Firstly, prepreg sheets are laminated up to the embedding layer position in which the light transfer medium 57 is to be embedded. Next, the holding sleeve 53, the light transfer medium 57, and the protection tube 54 are cleaned by ethanol. A plurality of pregreg sheets are laminated up to the embedding layer position, thus the plurality of prepreg sheets constitute a laminated layer prepreg sheet group. The cleaned holding sleeve 53, light transfer medium 57, and protection tube 54 are arranged on one side surface of the laminated layer prepreg sheet group in the direction of the prepreg sheet thickness. For example, the holding sleeve 53, the light transfer medium 57, and the protection tube 54 are arranged on the top of the prepreg sheet laminated on the uppermost layer of the laminated layer prepreg sheet group.

Further, the protection tube 54 is arranged so that along the top of the prepreg sheet group, the one end 54d thereof is partially projected outwardly from the periphery of the prepreg sheet group. The part of the protection tube 54 projected from the prepreg sheets is fixed to the dam 25 shown in FIG. 14 and the opening formed at the one end 54d of the protection tube 54 is blocked closely.

On the protection tube 54 and the light transfer medium 57 which are arranged like this, the residual prepreg sheets are laminated. When such a procedure is performed, the light transfer medium 57 is embedded and the precursor 150 is formed. In short, a hollow for installing the protection tube 54 and the light transfer medium 57 in the precursor 150 is provided. Further, around the hollow, a reinforcing member is embedded as required.

For the intermediate product 250 formed by heating and pressurizing the precursor 150 in which prepreg sheets are laminated, the trimming operation for cutting off the periphery to prepare the side thereof is performed. For that purpose, the one end 51a of the optical fiber 51 is positioned inwardly from one side of the precursor 150 and moreover, the one end 51a of the optical fiber 51 is positioned inwardly from the trimming position C of the intermediate product 250 which will be cut off by the trimming operation. Further, the one end 54d of the protection tube 54 is extended outwardly from the trimming position C of the precursor 150.

As mentioned above, when the light transfer medium 57, the holding sleeve 53, and the protection tube 54 are arranged on one prepreg sheet like this and then another prepreg sheet is laminated on the light transfer medium 57, the holding sleeve 53, and the protection tube 54, the light transfer medium 57, the holding sleeve 53, and the protection tube 54 can be easily embedded in the precursor 150.

At Step s3, the precursor 150 is heated and pressurized and formed as the intermediate product 250. As shown in FIG. 6A, the precursor 150 is heated and pressurized by the autoclave, thereby processed. When the processing is completed, the intermediate product 250 in which the optical fiber 51 is embedded is formed and the process goes to Step s4.

At Step s4, as shown in FIG. 6B, the intermediate product 250 is trimmed. At this time, the one end 54d of the protection tube 54 projected from the intermediate product 250 is also trimmed and cut. Concretely, one side of the intermediate product 250 is cut off by a diamond cutter. The one end 54d of the protection tube 54 is trimmed so as to prevent the one end 51b of the optical fiber 51 and the one end 53a of the holding sleeve from cutting off and then burrs formed on the end face of the protection tube 54 by trimming are removed. Next, air is sent into the protection tube 54 and foreign substances attached inside the protection tube 54 such as dust and moisture are removed. When such a process is completed, the manufacture of the connection structure of the light transfer medium 57 is completed, and the residual part of the intermediate product 250 is formed as the structural body 50, and the process goes to Step s5.

After forming by heating and pressurizing, the intermediate product 250 is trimmed to the trimming position C, thus one side of the structural body 50 is prepared and formed in a predetermined size and one side of the structural body 50 and one end face of the protection tube 54 after processing can be easily made flush with each other.

At Step s5, as shown in FIG. 6C, the ferrule 73 and another light transfer medium having the external optical fiber 52 are prepared and the external optical fiber 52 and the ferrule 73 are cleaned by ethanol. Next, the external optical fiber 52 is inserted from the one end 53a of the holding sleeve 53 and the one end face 51b of the optical fiber 51 embedded in the structural body 50 and the one end face 52b of the external optical fiber 52 are connected by making a face-to-face relationship with each other in a light transferable state. Further, the ferrule 73 of the external optical fiber 52 is fixed to the protection tube 54 by the adhesive 55. Furthermore, the plug 58 is installed at the other end of the external optical fiber 52, thus it can be easily connected to another external optical fiber and a light measuring instrument. When the connection with the external optical fiber 52 is completed like this, the process goes to Step s6 and the connection process of the optical fiber 51 ends.

According to the manufacturing method of the structural body in which the optical fiber is embedded in this embodiment, when the optical fiber 51 is inserted into the protection tube 54 before embedding the optical fiber in the structural body 50, an inserting operation can be performed separately from that during structural body manufacture. Therefore, the optical fiber 51 can be simply fit into the protection tube 54. Further, when the optical fiber 51 and the protection tube 54 are arranged at the time of laminating of prepreg sheets, there is no need to make an embedding hole for embedding in the structural body 50.

Further, when the optical fiber 51 and the protection tube 54 are embedded in the precursor 150 before forming by heating and pressurizing, during forming by heating and pressurizing, fused resin flows in between the optical fiber 51, the outer peripheral surface of the protection tube 54, and the precursor 150, thus the optical fiber 51 and the protection tube 54 can be closely fixed integratedly with the structural body 50. Therefore, a particular fixing process for fixing the optical fiber 51 is not required and the optical fiber 51 can be integratedly fixed to the structural body 50. Further, the protection tube 54 is formed by a material well-suited to fused resin, thus it is prevented from becoming a starting point of generation of damage of the part of the structural body 50 in which the protection tube 54 is embedded. Further, as another embodiment of the present invention, when the light transfer medium 57 is to be embedded, a space where the protection tube 54 will be embedded may be provided beforehand in a part of the precursor 150.

The one end 51b of the optical fiber 51 is positioned inwardly from the trimming position C of the precursor 150 and the one end 54d of the protection tube 54 is extended outwardly from the trimming position C, thus the part from one side of the intermediate product 250 to the trimming position C can be eliminated without causing damage to the optical fiber 51. Without causing damage to the optical fiber 51, the trimming operation is performed after forming of the intermediate product 250 and the side of the structural body 50 can be prepared. Further, during trimming, the possibility of attaching of cooling water to one end face of the optical fiber 51 can be reduced.

Further, the projected part of the protection tube 54 projected from the intermediate product 250 is cut off by trimming. Therefore, the side of the structural body 50 which is formed after trimming of the intermediate product 250 and the other end face of the protection tube 54 can be easily made flush with each other. Therefore, when the protection tube 54 is to be arranged in the precursor 150, there is no need to precisely position them so as to make the other end face of the protection tube 54 flush with the side of the precursor 150.

Further, the protection tube 54 is covered in a state that the opening formed at the one end 54d is blocked as shown in FIGS. 5C and 6A, so that during forming of the precursor 150 by heating and pressurizing, the possibility of penetration of fused resin into the one end face 51b of the optical fiber 51 can be prevented. Furthermore, the optical fiber 51 is embedded in the precursor 150 in a state that it is inserted in the protection tube 54, so that the one end 51a of the optical fiber 51 can be prevented from deformation.

Further, even if the optical fiber 51 is embedded, a projection projected outwardly from the surface of the precursor 150 to be pressed by the pressurizing sheet 28 is not formed, so that even during forming by heating and pressurizing, the surface of the precursor 150 can be pressed flat by the pressurizing sheet 28 and also poor deaeration can be prevented. By doing this, a good structural body 50 can be formed.

After manufacture of the structural body 50, the other optical fiber 52 is connected from the outside in a light transferable state, so that during manufacture of the structural body 50, the optical fiber 51 projected from the structural body 50 does not exist and the optical fiber 51 can be prevented from causing obstacles to manufacture and transport of the structural body 50. Further, in the manufacturing method shown in FIGS. 5A to 6C, the optical fiber 51, the holding sleeve 53, and the protection tube 54 are arranged on the prepreg sheets. However, when the optical fiber 51 is to be additionally arranged, in the prepreg sheet in contact with the protection tube 54, an arrangement space where the protection tube 54 is fit, for example, a fit concavity may be formed. When the protection tube 54 is fit into the fit concavity, an arrangement space of the protection tube 54 can be installed beforehand and the gap between the prepreg sheet in contact with the protection tube 54 and the protection tube 54 can be reduced. By doing this, the precursor 150 can be prevented more from defective forming during forming by heating and pressurizing.

Figure 8A:
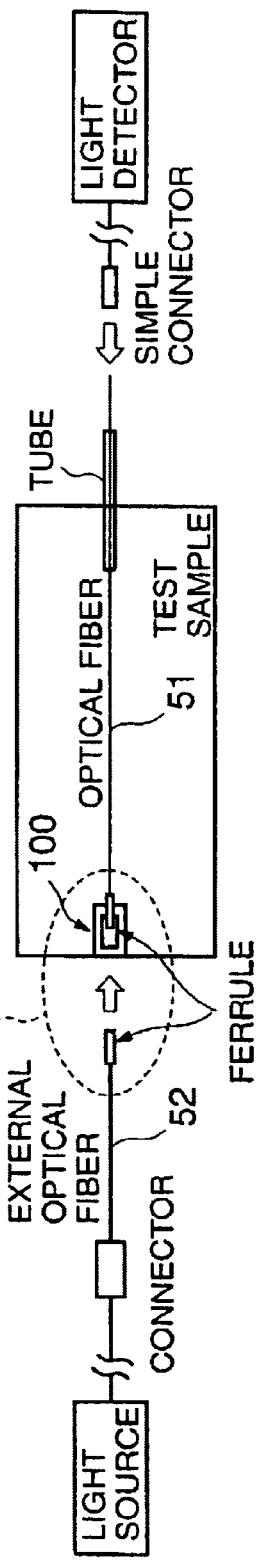
FIGS. 8A and 8B are block diagrams showing a rough constitution for measuring a light intensity of the connection structure of the light transfer medium as an embodiment of the present invention and a connection structure as a comparative example.
Figure 8B:
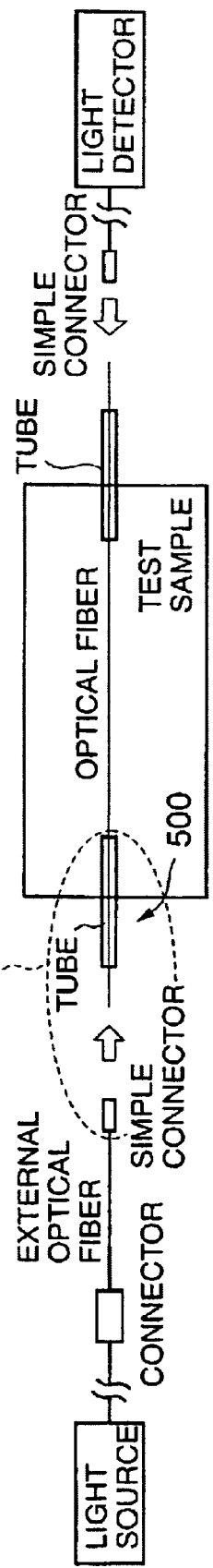

FIGS. 8A and 8B are block diagrams showing the rough constitution for measuring the light intensity of light which is transferred through the light transfer medium 57 of the connection structure 100 as the embodiment of the present invention and a connection structure 500 of a comparative example. FIG. 8A shows the connection structure 100 of the embodiment of the present invention. FIG. 8B shows the connection structure 500 of the light transfer medium of the comparative example. The optical fiber 51 is embedded in a structural body as test sample and the connection structure 100 of the embodiment of the present invention is installed at an end of the structural body. Next, the one end 52a of the external optical fiber 52 is inserted into the holding sleeve 53 from the outside and connected to the one end 51b of the optical fiber 51 to be embedded. Further, in the comparative example 500, the optical fiber is embedded so as to pass through the structural body and the tube is projected from one end of the structural body. Next, an end of the optical fiber to be embedded is inserted through the tube so as to be pulled out from the structural body, and connected to an end of another external optical fiber via a simple connector in a removable state. The other ends of the external optical fibers used in the constitutions of the embodiment of the present invention and the comparative example are respectively connected to light sources. The other ends of the optical fibers used and embedded in the constitutions of the present invention and the comparative example are respectively connected to light detectors etc.

Further, Table 1 is a table showing, with respect to the constitutions for light intensity measurement shown in FIGS. 8A and 8B, the light loss in the connection structure parts of the connection structure 100 of the embodiment of the present invention and the connection structure 500 of the comparative example.

TABLE 1

| Connection structure of light transfer medium | Light loss |
| --- | --- |
| Connection structure of embodiment of present invention (FIG. 8A) | 3.5 dB |
| Connection structure by removable simple connector (FIG. 8B) | 10 dB |

As Table 1 shows, the light loss in the connection structure part in the comparative example is 10 dB and the light loss in the connection structure part of the present invention is 3.5 dB. According to the embodiment of the present invention, the holding sleeve 53 holds a ferrule covering each optical fiber, thus the optical axes of the optical fibers can be matched surely. As mentioned above, connection of the light transfer medium by the connection structure of the embodiment of the present invention reduces the light loss, thereby the light loss reduction effect can be obtained.

Figure 9:
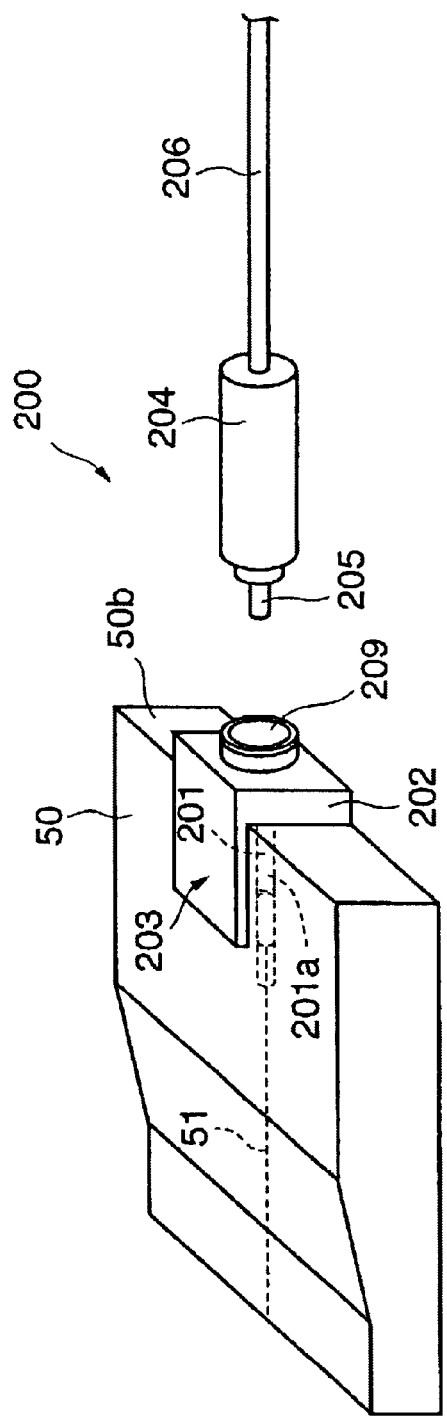
FIG. 9 is a perspective view showing a connection structure of a light transfer medium as another embodiment of the present invention.
Figure 10:
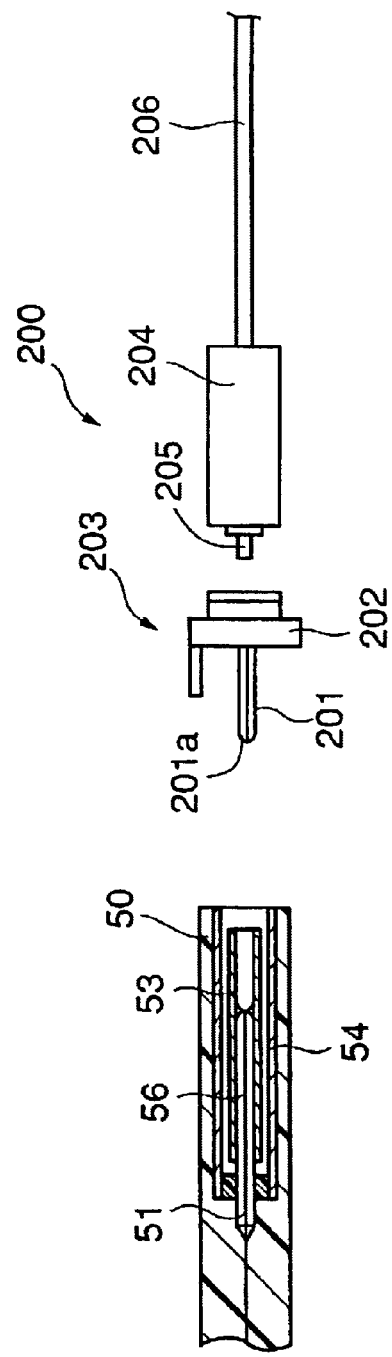
FIG. 10 is an exploded sectional view showing the connection structure shown in FIG. 9.

FIG. 9 is a perspective view showing a connection structure 200 of a light transfer medium as another embodiment of the present invention, and FIG. 10 is a exploded sectional view showing the connection structure 200 shown in FIG. 9. The connection structure 200 of the present embodiment is similar to the connection structure 100 shown in FIGS. 1 to 4. Therefore, regarding the constitutions of the present invention identical to or substantially identical to those of the connection structure 200, the explanation will be omitted and the same numerals are assigned.

The connection structure 200 has an adapter 203 in which a ferrule 201 and an optical fiber are installed and another optical fiber having a plug 204 at its end. The plug 204 can be connected to the adapter 203 in a light transferable state. The ferrule 201 installed in the adapter 203 is held by the holding sleeve 53 shown in FIG. 1. By doing this, an end 201a of the optical fiber of the adapter 203 and an end of the optical fiber 51 of the embedded light transfer medium 57 make a face-to-face relationship with each other and are connected to each other in a light transferable state.

The adapter 203 has an adapter body 202 for supporting the ferrule 201. In the adapter body 202, a fit concavity 209 where the plug 204 is fit is formed. By doing this, the adapter 203 and the plug 204 can be connected so as to be able to mechanically remove. Concretely, the plug 204 is inserted into the fit concavity 209 so that, in the fit concavity 209, a ferrule 205 installed on the plug 204 makes contact with the other end of the ferrule 201 of the adapter 202. The adapter 203 is attached to the side 50b of the structural body 50 after trimming.

The connection structure 200 of the present invention can obtain the same effect as that of the connection structure 100 of the embodiment of the present invention. For example, in the connection structure 200 of the present embodiment, the ferrule 201 of the adapter 203 is held by the holding sleeve 53 in the protection tube 54 and the ferrule 201 of the adapter 203 is inserted into the structural body. Therefore, the whole adapter is not embedded in the structural body, and the volume embedded in the structural body is smaller than that of an embedding type connector which is embedded as a whole, and the effect of the connection structure on the mechanical characteristics of the structural body can be reduced. Further, the adapter 203 is attached to the structural body 50, thus the optical fiber can be connected in a removable state and a light signal can be transferred to the outside more easily.

Figure 11:
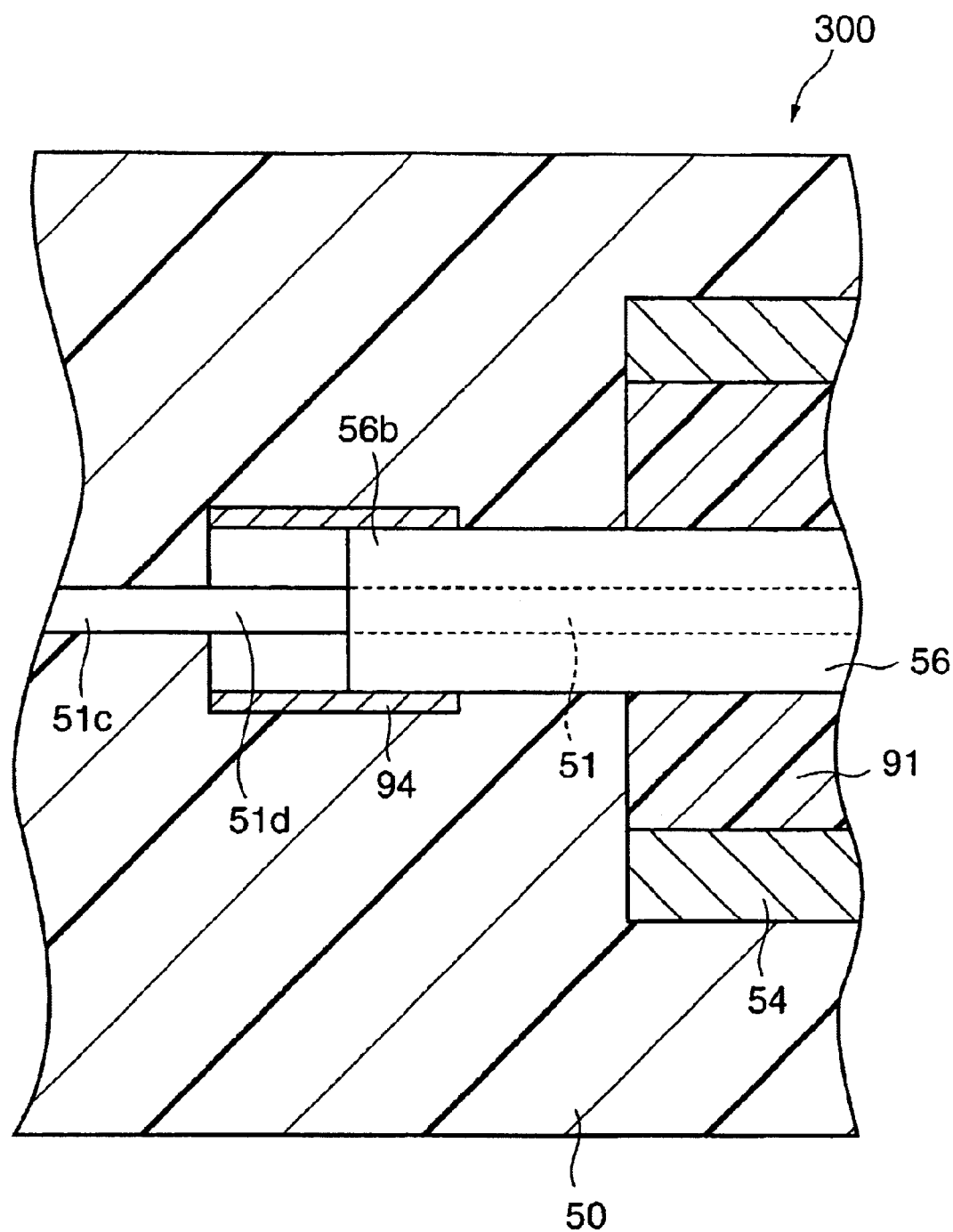
FIG. 11 is a sectional view showing a part of a connection structure of a light transfer medium as still another embodiment of the present invention.

FIG. 11 is a sectional view showing a part of a connection structure 300 of a light transfer medium as still another embodiment of the present invention. The connection structure 300 of the light transfer medium of the present embodiment shown in FIG. 11 has the same constitution as that of the embodiment shown in FIG. 1 except the covering member 92. Therefore, regarding the constitutions of the present invention identical to or substantially identical to those of the embodiment shown in FIG. 1, the explanation will be omitted and the same numerals are assigned.

The light transfer medium has the optical fiber 51, the ferrule 56, and a cover tube 94. The cover tube 94 is formed cylindrically and can obtain the same effect as that of the covering member 92 of the embodiment shown in FIG. 1. The cover tube 94 is fit into the other end 56b of the ferrule 56 and projected from the other end 56b of the ferrule 56. Namely, the cover tube 94 surrounds the transitional part 51d of the exposed part 51c of the optical fiber 51 on the ferrule side with a space left in the peripheral direction of the optical fiber. Therefore, when the optical fiber 51 is curved, the cover tube 94 makes contact with the outer peripheral part of the optical fiber 51 and the optical fiber 51 is prevented from additional curving. Therefore, the optical fiber 51 can be prevented from bending. By doing this, even when unreasonable force is generated in the optical fiber 51 and the ferrule 56, the optical fiber 51 is prevented from bending, thus the optical fiber 51 is prevented from damage. By doing this, when the light transfer medium is to be embedded in the precursor 150, the optical fiber 51 can be prevented from damage. Further, when a non-elastic cover tube 54 is used, a robot or an operator holds the cover tube 94, thus it is easy to handle the light transfer medium 57 without causing damage thereto.

Figure 12A:
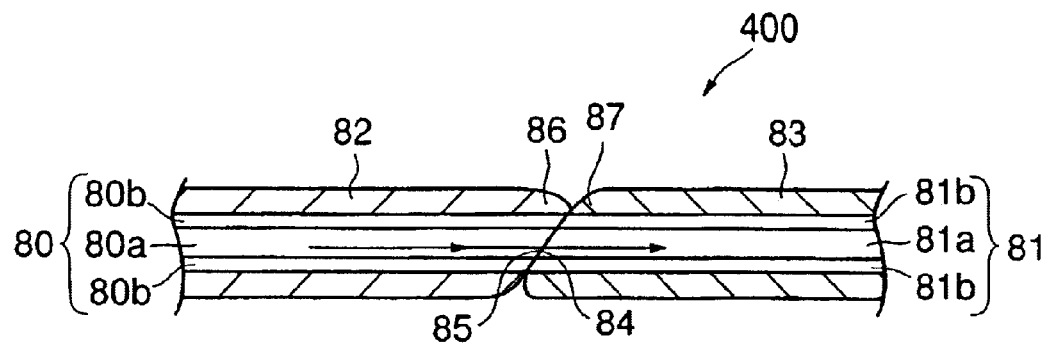
FIGS. 12A and 12B are sectional views showing a part of a connection structure of a light transfer medium as still another embodiment of the present invention.
Figure 12B:
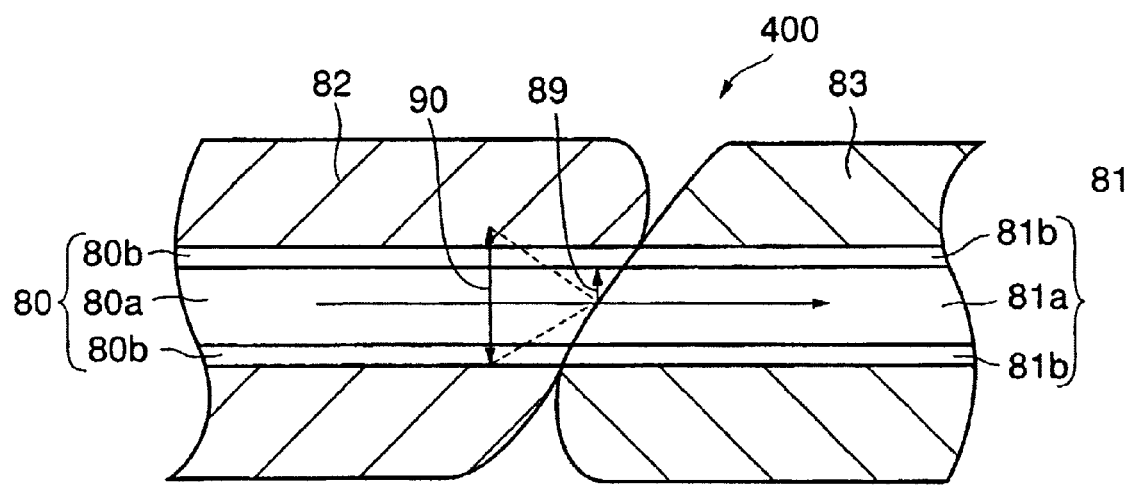

FIG. 12A is a sectional view showing a part of a connection structure 400 of a light transfer medium as a further embodiment of the present invention. FIG. 12B is an enlarged sectional view showing a part of FIG. 12A. The connection structure 400 of the light transfer medium shown in FIGS. 12A and 12B show the constitution of optical fibers 80 and 81 connected in a light transferable state and ferrules 82 and 83 covering the optical fibers 80 and 81, and the other constitution is the same as that of an embodiment shown in FIG. 1, and the explanation thereof will be omitted. In FIGS. 12A and 12B, light travels to the right. The optical fibers 80 and 81 have cores 80a and 81a and clads 80b and 81b through which light passes. The materials of the cores 80a and 81a and the clads 80b and 81b are, for example, light-transmissible quartz or resin and the material of the ferrules 82 and 83 is, for example, zirconea ceramics.

The optical fibers 80 and 81 are in a light transferable state that the end faces are in contact with each other and light passes from a face 84 of the optical fiber 80 to another face 85 of the optical fiber 81. Therefore, the contact faces of the optical fibers 80 and 81 are respectively a light outlet surface 84 and a light inlet surface 85.

The ferrules 82 and 83 have slant end faces. Namely, ends 86 and 87 thereof are slantwise cut to the axial lines of the optical fibers 80 and 81. Moreover, the ends 86 and 87 of the ferrules 82 and 83 are formed in an almost convex semispherical shape. Further, the optical fibers 80 and 81 are slantwise cut to the axial lines thereof and the end faces thereof are in contact with each other. By use of such a constitution, existence of air is prevented, and the reflection attenuation is prevented from reduction, thus the connection loss can be reduced.

As shown in FIG. 12B, in the optical fibers 80 and 81 which are connected in a different configuration from that shown in FIG. 4, reflected light 89 reflected from the light outlet face 84 of the optical fiber 80 on the light outlet side returns slantwise to the optical axis of the optical fiber 80. Therefore, it is beyond a propagatable range 90 of the optical fiber 80. By doing this, light cannot propagate in the optical fiber and the reflected light does not return practically. By doing this, the reflection attenuation can be increased more.

The aforementioned embodiments are just examples of the present invention and within the range of the invention, the constitution can be changed.

For example, the structural body 50 in which optical fiber is to be embedded may be composed of a metal or resin.

Moreover, regarding the precursor 150 composed of laminated prepreg sheets, the lamination constitution may be any layer structure.

Further, in the above-mentioned embodiments, the ferrule 56 is held by the holding sleeve 53 and inserted into the protection tube 54. However, instead of this configuration, the inner peripheral diameter of the protection tube 54 may be made substantially equal to the outer peripheral diameter of the ferrule 56, thus the protection tube 54 and the ferrule 56 may be directly fit.

Further, the protection tube 54 is formed in a tube having a circular cross section in the above-mentioned embodiments. However, instead of this configuration, a slit passing through a wall of the protection tube 54 in the radial direction may be formed and, the ferrule 56, which is an element of the light transfer medium, may be directly held by the protection tube 54. The protection tube 54 and the ferrule 56 are held free of play, thus the number of parts can be reduced by omitting the holding sleeve 53, and the axial line of the protection tube 54 can coincide with the axial line of the optical fiber 51.

Figure 13:
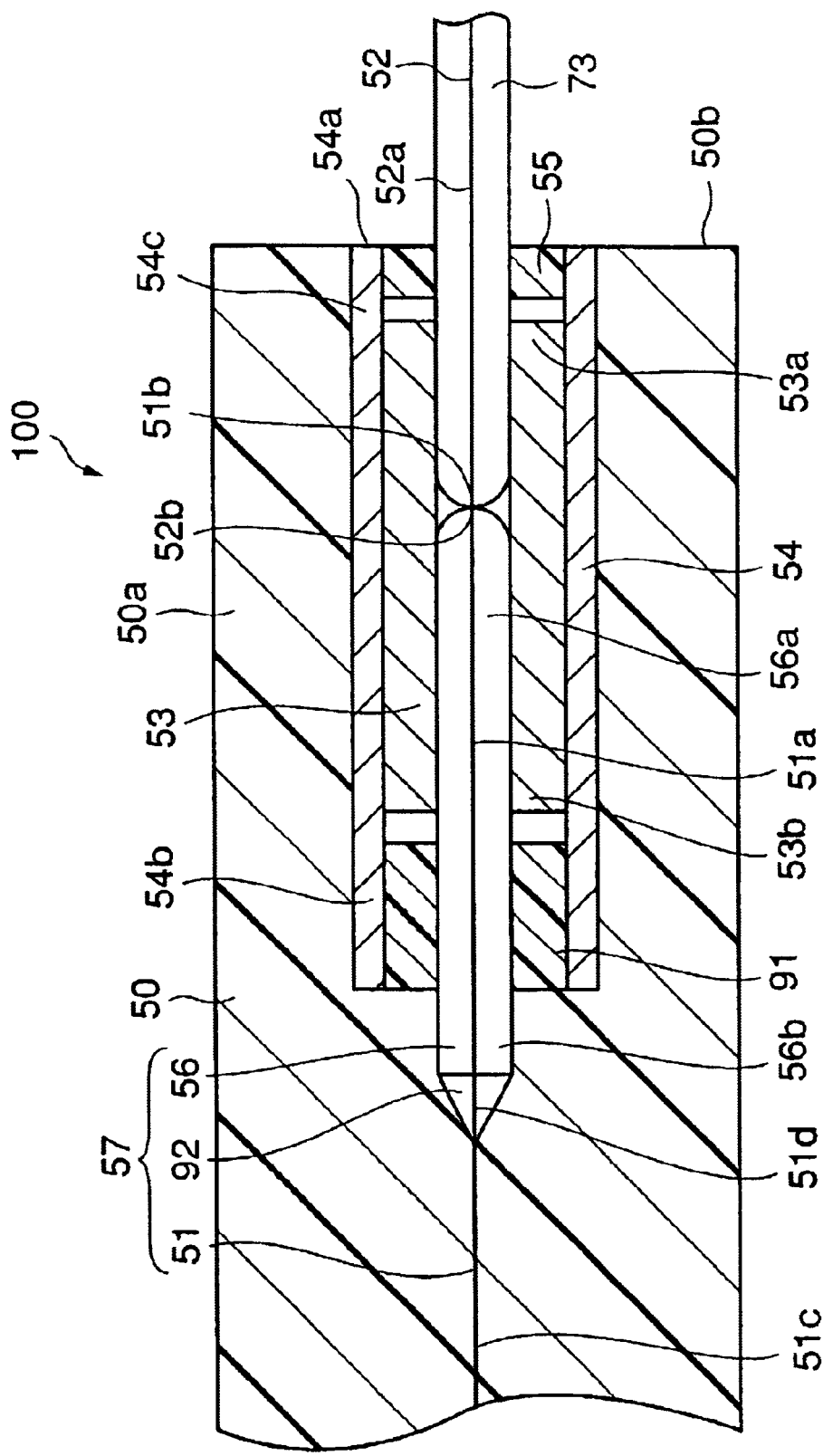
FIG. 13 is a sectional view showing a connection structure of a light transfer medium embedded in a structural body of the connection structure as a variation of the embodiment of the present invention shown in FIG. 1.

Further, in the above-mentioned embodiment, a gap is formed between the holding sleeve 53 and the protection tube 54. However, instead of this configuration, there may be no gap between the holding sleeve 53 and the protection tube 54 as shown in FIG. 13. When no gap is formed like this, play between the holding sleeve 53 and the protection tube 54 can be eliminated.

Further, it is enough that the end face of the optical fiber 51 is arranged so as to be able to transfer light. Namely, the optical fibers 51 and 52 are arranged such that the axial lines of the optical fibers 51 and 52 coincide with each other. Therefore, the end faces of the optical fibers 51 and 52 preferably make contact with each other. However, the end faces of the optical fibers 51 and 52 may not make contact with each other.

Further, in the above-mentioned embodiments, the optical fiber 51 embedded in the structural body 50 is connected to the other optical fiber 52 from the side of the structural body 50. However, the optical fiber embedded in the structural body may be connected to the other optical fiber from a surface other than the side, for example, the face on one side in the thickness direction. Further, the other optical fiber 52 inserted from the outside of the structural body 50 may be fixed by screwing instead of adhesion.

Further, in the above-mentioned embodiments, at the time of forming the precursor, that is, lamination of prepreg sheets, the protection tube 54 and the light transfer medium 57 are arranged, and furthermore prepreg sheets are arranged, and they are formed by heating and pressurizing, thus resin is fused and closely covers the outer periphery of the protection tube 54 and the light transfer medium 57, thereby the protection tube 54 and the light transfer medium 57 are embedded. Further, as another embodiment, an arrangement space where the protection tube 54 will be embedded after forming of the structural body may be formed beforehand at the time of lamination of prepreg sheets and for example, a fit concavity where the protection tube 54 is to be fit may be formed in the prepreg sheets.

Further, the other end of the optical fiber 51 embedded in the structural body 50 may be structured in the same way as with the one end 51a. Both ends of the optical fiber 51 embedded in the structural body 50 are inserted into the protection tube 54, thus the light source and light measuring instrument can be easily connected to both ends of the optical fiber 51. Further, the optical fiber 51 may be of a transmission type that light entering from the one end 51a outgoes from the other end, or of a reflection type that light entering from one end reflects from the other end, turns back, and outgoes from the one end 51a.

What is claimed is:

1. A connection structure of a light transfer medium comprising:
   a light transfer medium embedded in a structural body; and
   a protection tube in which said light transfer medium is inserted said protection tube is embedded in said structural body at one end portion of said structural body,
   wherein one end portion of said light transfer medium is inserted into said protection tube such that an end of said one end portion of said light transfer medium is positioned inwardly from one end fare of said one end portion of said structural body; and
   a covering member covering at least a portion of said light transfer medium, the covering member made of an elastic material.

2. A connection structure of a light transfer medium according to claim 1, further comprising a holding sleeve inserted into said protection tube, herein said holding sleeve elastically holds said one end portion of said light transfer medium and also can elastically hold another light transfer medium to be inserted from an outside of said structural body so that a central axis of said light transfer medium and a central axis of said another light transfer medium are aligned with each other.

3. A connection structure of a light transfer medium according to claim 2, wherein said holding sleeve has a substantially C-shaped cross section.

4. A connection structure of a light transfer medium according to claim 2, wherein said holding sleeve is inserted into said protection tube with a gap therebetween.

5. A connection structure of a light transfer medium according to claim 2, wherein said holding sleeve is fit into said protection tube.

6. A connection structure of a light transfer medium according to claim 1, wherein said light transfer medium includes:
   an optical fiber,
   a ferrule for covering one end of said optical fiber, and
   said covering member covering a transitional part of an exposed part of said optical fiber extended from said ferrule to suppress a displacement of said transitional part which is located adjacent to said ferrule.

7. A connection structure of a light transfer medium according to claim 6, wherein said covering member surrounds said transitional part of said optical fiber in contact relationship.

8. A connection structure of a light transfer medium according to claim 6, wherein said covering member surrounds said transitional part of said optical fiber in non-contact relationship.

9. A connection structure of a light transfer medium according to claim 1, wherein said one end portion of said light transfer medium has a slant end face.

10. A method of manufacturing a connection structure of a light transfer medium comprising:

inserting one end portion of a light transfer medium into a protection tube so that an end of said one end portion of said light transfer medium is positioned inwardly from one end face of said protection tube;

sealing the other end face of said protection tube in which said light transfer medium is inserted;

embedding said protection tube and said light transfer medium in a precursor such that said end of said one end portion of said light transfer medium is positioned inwardly from one end face of said precursor and said tube is partially projected from said one end face of said precursors;

heating and pressurizing said precursor in which said protection tube and said light transfer medium are embedded; and cutting said precursor and said protection tube such that said end of said end portion of said light transfer medium is still positioned inwardly from a newly formed end face of said precursor.

11. A method of manufacturing a connection structure of a light transfer medium according to claim 10, further comprising:

attaching a holding sleeve to said one end portion of said light transfer medium before inserting said one end portion of said light transfer medium into said protection tube;

wherein said holding sleeve is inserted into said protection tub.

12. A method of manufacturing a connection structure of a light transfer medium according to claim 11, wherein said holding sleeve has a substantially C-shaped cross section so as to hold said one end portion of said light transfer medium elastically.

13. A method of manufacturing a connection structure of a light transfer medium according to claim 11, wherein said holding sleeve is inserted into said protection tube with a gap therebetween.

14. A method of manufacturing a connection structure of a light transfer medium according to claim 11, wherein said holding sleeve is fit into said protection tube.

15. A method of manufacturing a connection structure of a light transfer medium according to claim 10, wherein said precursor comprises laminated thermoset prepreg sheets.

\* \* \* \* \*